United States Patent
Li et al.

(10) Patent No.: US 12,317,329 B2
(45) Date of Patent: May 27, 2025

(54) RACH PROCEDURES BASED UPON DOWNLINK RECEIVE CAPABILITY LEVEL OF A USER EQUIPMENT

(71) Applicants: QUALCOMM Incorporated, San Diego, CA (US); Qiaoyu Li, Beijing (CN); Chao Wei, Beijing (CN); Jing Lei, San Diego, CA (US); Wanshi Chen, San Diego, CA (US); Hao Xu, Beijing (CN); Yu Zhang, San Diego, CA (US); Peter Pui Lok Ang, San Diego, CA (US); Krishna Kiran Mukkavilli, San Diego, CA (US)

(72) Inventors: Qiaoyu Li, Beijing (CN); Chao Wei, Beijing (CN); Jing Lei, San Diego, CA (US); Wanshi Chen, San Diego, CA (US); Hao Xu, Beijing (CN); Yu Zhang, San Diego, CA (US); Peter Pui Lok Ang, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 326 days.

(21) Appl. No.: 17/775,481

(22) PCT Filed: Dec. 10, 2019

(86) PCT No.: PCT/CN2019/124228
§ 371 (c)(1),
(2) Date: May 9, 2022

(87) PCT Pub. No.: WO2021/114069
PCT Pub. Date: Jun. 17, 2021

(65) Prior Publication Data
US 2022/0417999 A1 Dec. 29, 2022

(51) Int. Cl.
*H04W 74/0833* (2024.01)
*H04W 74/0836* (2024.01)

(52) U.S. Cl.
CPC ........................... *H04W 74/0833* (2013.01)

(58) Field of Classification Search
CPC ......... H04W 74/0833; H04W 74/0836; H04W 74/0838
See application file for complete search history.

(56) References Cited

U.S. PATENT DOCUMENTS

2018/0368181 A1  12/2018  Lee et al.
2019/0215220 A1  7/2019   Islam et al.
(Continued)

FOREIGN PATENT DOCUMENTS

CN  108012329 A   5/2018
CN  110268795 A   9/2019
(Continued)

OTHER PUBLICATIONS

Ericsson: "Procedure for Two-Step RACH", 3GPP TSG-RAN WG1 Meeting #98, R1-1910907, Chongqing, China, Oct. 14-18, 2019, Oct. 18, 2019 (Oct. 18, 2019) The Whole Document, pp. 1-18, XP051808739, Retrieved from the Internet: URL: https://ftp.3gpp.org/tsg_ran/WG1_RL1/TSGR1_98b/Docs/R1-1910907.zip. R1-1910907 Procedure for Two-step RACH.docx [retrieved on Oct. 5, 2019].

(Continued)

*Primary Examiner* — Kent Krueger
(74) *Attorney, Agent, or Firm* — Muncy, Geissler, Olds & Lowe, P.C.

(57) ABSTRACT

In an aspect, a UE and BS perform a RACH procedure whereby a preamble sequence group for a preamble is associated with a downlink receive capability of the UE. In another aspect, a UE and BS perform a RACH procedure (Continued)

whereby a preamble sequence group is associated with a group-specific RA-RNTI that is used to scramble an associated DCI communication. In another aspect, UEs performing a RACH procedure with a BS via different sets of ROs may monitor the same GC-DCI scrambled with a common RA-RNTI. In another aspect, a UE and BS perform a 2-Step RACH procedure whereby a Msg-A payload includes information indicative of a downlink receive capability level associated with the UE.

23 Claims, 21 Drawing Sheets

(56) References Cited

U.S. PATENT DOCUMENTS

| | | | |
|---|---|---|---|
| 2019/0254071 | A1 | 8/2019 | Park |
| 2019/0335506 | A1 | 10/2019 | Agiwal et al. |
| 2021/0007147 | A1* | 1/2021 | Yang ................... H04W 56/001 |
| 2022/0400511 | A1* | 12/2022 | Li .............................. H04L 1/20 |

FOREIGN PATENT DOCUMENTS

| | | |
|---|---|---|
| CN | 110546981 A | 12/2019 |
| WO | 2018083376 A1 | 5/2018 |
| WO | 2019024130 A1 | 2/2019 |
| WO | 2019062779 A1 | 4/2019 |
| WO | 2021102794 A1 | 6/2021 |

OTHER PUBLICATIONS

International Search Report and Written Opinion—PCT/CN2019/124228—ISA/EPO—Sep. 15, 2020.
Qualcomm Incorporated: "Procedures for Two-Step RACH", 3GPP TSG-RAN WG1 Meeting #97, R1-1907256, 3GPP Draft, R1-1907256 Procedures for Two-Step RACH, 3rd Generation Partnership Project(3GPP), Mobile Competence Centre, 650, Route Des Lucioles, F-06921 Sophia-AntipolisCedex, France, vol. RAN WG1, May 13. 2019-May 17, 2019, Reno, USA, May 17, 2019 (May 17, 2019), pp. 1-13, XP051728696, Retrieved from the Internet: URL: http://www.3gpp.org/ftp/Meetings%5F3GPP%5FSYNC/RAN1/Docs/R1%2D1907256%2Ezip. [retrieved on May 13, 2019].
Vivo: "Other Aspects for 2-Step RACH and UE Features", 3GPPDraft, R1-1912006, 3GPP TSG RAN WG1 #99. 3rd Generation Partnership Project(3GPP), Mobile Competence Centre, 650, Route Des Lucioles, F-06921, Sophia-AntiPolis Cedex, France, vol. RAN WG1. No. Reno, Nevada, US, Nov. 18, 2019-Nov. 22, 2019, Nov. 8, 2019 (Nov. 8, 2019), XP051819900, Retrieved from the Internet: URL: https://ftp.3gpp.org/tsg_ran/WG1_RL1/TSGR1_99/Docs/R1-1912006.zip R1-1912006_Discussion on channel structure for2-step RACH.docx [retrieved on Nov. 8, 2019].
3GPP TS 38.213: "3rd Generation Partnership Project, Technical Specification Group Radio Access Network, NR, Physical Layer Procedures for Control (Release 15)", 3GPP Standard, Technical Specification, 3rd Generation Partnership Project, Mobile Competence Centre, 650, Route Des Lucioles, F-06921 Sophia-Antipolis Cedex, France, vol. Ran WG1. No. V15.7.0, Sep. 28, 2019, pp. 1-108, XP051785089, section 1, section 8.
Supplementary European Search Report—EP19955754—Search Authority—The Hague—Jul. 19, 2023.

* cited by examiner

RACH PROCEDURES BASED UPON DOWNLINK RECEIVE CAPABILITY LEVEL OF A USER EQUIPMENT

CROSS-REFERENCE TO RELATED APPLICATION

The present Application for Patent claims priority under 35 U.S.C. § 371 to International Application No. PCT/CN2019/124228, entitled "RACH PROCEDURES BASED UPON DOWNLINK RECEIVE CAPABILITY LEVEL OF A USER EQUIPMENT," filed Dec. 10, 2019, which is assigned to the assignee hereof and expressly incorporated herein by reference in its entirety.

BACKGROUND OF THE DISCLOSURE

1. Field of the Disclosure

Aspects of the disclosure relate generally to wireless communications and to techniques and apparatuses related to random access channel (RACH) procedures based upon downlink receive capability levels of a user equipment (UE).

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

As noted above, various device types may be characterized as UEs. Starting in 3GPP Rel. 17, a number of these UE types are being allocated a new UE classification denoted as 'NR-Light'. Examples of UE types that fall under the NR-Light classification include wearable devices (e.g., smart watches, etc.), industrial sensors, video cameras (e.g., surveillance cameras, etc.), and so on. Generally, the UE types grouped under the NR-Light classification are associated with lower communicative capacity. For example, relative to 'normal' UEs (e.g., UEs not classified as NR-Light), NR-Light UEs may be limited in terms of maximum bandwidth (e.g., 5 MHz, 10 MHz, 20 MHz, etc.), maximum transmission power (e.g., 20 dBm, 14 dBm, etc.), number of receive antennas (e.g., 1 receive antenna, 2 receive antennas, etc.), and so on. Some NR-Light UEs may also be sensitive in terms of power consumption (e.g., requiring a long battery life, such as several years) and may be highly mobile. Moreover, in some designs, it is generally desirable for NR-Light UEs to co-exist with UEs implementing protocols such as eMBB, URLLC, LTE NB-IoT/MTC, and so on.

Starting in 3GPP Rel. 14, multi-user superposition transmission (MUST) was introduced to enhance PDSCH capacity in the symbol domain. In an example, the modulation order and power ratio between pairing of a far-UE and a near-UE can be indicated via DCI, and the near-UE can use this information to perform the cancellation of the far-UE's signal. In accordance with 3GPP Rel. 14, the near-UE would assume that a single far-UE with identical modulation order is MUSTed on top of its own signal, within the whole PDSCH wideband.

In a scenario where the UE corresponds to a particular class of UE, such as an NR-Light UE, it is possible that Msg-1 preamble or the Msg-A preamble is successfully received at BS, but the RAR (e.g., Msg-2 of 304 or Msg-B RAR) is not successfully received at the UE. For example, so-called 'premium' UEs may comprise more receivers (e.g., 2, 4, etc.) than a low-tier UE (e.g., NR-Light UE, which may comprise 1 or 2 receivers). In this case, it is possible for a low-tier UE that requires RAR repetitions to be paired with (or MUSTed with) a premium UE that does not require RAR repetitions.

One or more embodiments of the disclosure are directed to various 2-Step or 4-Step RACH procedures, and in some designs may be used for scenarios where a UE belonging to a first UE class (e.g., NR-Light UE or any UE with a number of receivers below a threshold) is treated as a virtual far-UE, while being MUSTed with a UE belonging to a second UE class (e.g., a premium UE or any UE with a number of receivers that is not below the threshold) that is treated as a virtual near-UE. In some designs, a plurality of preamble sequence groups with a set of ROs, whereby each respective preamble sequence group is associated with a different repetition level for a downlink message (e.g., Msg-B RAR or Msg-3 RAR). In some designs, the various embodiments described below are implemented with respect to UEs that belong to a particular UE class (e.g., UEs with limited downlink receive capability, such as NR-Light UEs). As used herein, a "set" of ROs refers to a grouping of one or more ROs.

In an aspect of the disclosure, a method, a computer-readable medium, and an apparatus are provided. The apparatus may be a UE. The UE may identify a first set of random access channel (RACH) opportunities (ROs) over which to transmit a preamble associated with a RACH procedure;

selecting a first preamble sequence group from among a plurality of preamble sequence groups associated with the identified first set of ROs based on a downlink receive capability of the UE, wherein the first preamble sequence group is associated with a first UE downlink receive capability level and a second preamble sequence group among the plurality of preamble sequence groups is associated with a second UE downlink receive capability level that is different than the first UE downlink receive capability level, transmit the preamble on the identified set of ROs, and receive, in response to the transmitted preamble, a random access response (RAR).

In another aspect of the disclosure, a method, a computer-readable medium, and an apparatus are provided. The apparatus may be a base station. The base station may receive, from a user equipment (UE), a preamble associated with a random access channel (RACH) procedure over one of a plurality of sets of RACH opportunities (ROs), wherein the set of ROs over which the preamble is received is associated with a first preamble sequence group among a plurality of preamble sequence groups, wherein the first preamble sequence group is associated with a first UE downlink receive capability level and a second preamble sequence group among the plurality of preamble sequence groups is associated with a second UE downlink receive capability level that is different than the first UE downlink receive capability level, and transmit, in response to the preamble, a random access response (RAR).

In an aspect of the disclosure, a method, a computer-readable medium, and an apparatus are provided. The apparatus may be a UE. The UE may identify a first set of random access channel (RACH) opportunities (ROs) over which to transmit a preamble associated with a RACH procedure, select a first preamble sequence group from among a plurality of preamble sequence groups associated with the identified first set of ROs based on a downlink receive capability of the UE, wherein the first preamble sequence group is associated with a first UE downlink receive capability level and a second preamble sequence group among the plurality of preamble sequence groups is associated with a second UE downlink receive capability level that is lower than the first UE downlink receive capability level, wherein the first preamble sequence group is associated with a first random access radio network temporary identifier (RA-RNTI) and the second preamble sequence group is associated with a second RA-RNTI that is different than the first RA-RNTI, transmit the preamble on the identified set of ROs, and monitor a downlink control information (DCI) communication that is scrambled using the first RA-RNTI.

In another aspect of the disclosure, a method, a computer-readable medium, and an apparatus are provided. The apparatus may be a base station. The base station may receive, from a user equipment (UE), a preamble associated with a random access channel (RACH) procedure over one of a plurality of sets of RACH opportunities (ROs), wherein the set of ROs over which the preamble is received is associated with a first preamble sequence group among a plurality of preamble sequence groups, wherein the first preamble sequence group is associated with a first UE downlink receive capability level and a second preamble sequence group among the plurality of preamble sequence groups is associated with a second UE downlink receive capability level that is lower than the first UE downlink receive capability level, wherein the first preamble sequence group is associated with a first random access radio network temporary identifier (RA-RNTI) and the second preamble sequence group is associated with a second RA-RNTI that is different than the first RA-RNTI, and transmit, in response to the preamble, a downlink control information (DCI) communication that is scrambled using the first RA-RNTI.

In an aspect of the disclosure, a method, a computer-readable medium, and an apparatus are provided. The apparatus may be a UE. The UE may identify a first set of random access channel (RACH) opportunities (ROs) over which to transmit a preamble associated with a RACH procedure, select a first preamble sequence group from among a plurality of preamble sequence groups associated with the identified first set of ROs based on a downlink receive capability of the UE, wherein the first preamble sequence group is associated with a first UE downlink receive capability level and a second preamble sequence group among the plurality of preamble sequence groups is associated with a second UE downlink receive capability level that is higher than the first UE downlink receive capability level, transmit the preamble on the identified set of ROs, and monitor a group common (GC)-downlink control information (DCI) communication that is scrambled using a common random access radio network temporary identifier (RA-RNTI).

In another aspect of the disclosure, a method, a computer-readable medium, and an apparatus are provided. The apparatus may be a base station. The base station may receive, from a first user equipment (UE), a first preamble associated with a first random access channel (RACH) procedure over a first set of ROs among a plurality of sets of RACH opportunities (ROs), wherein the first set of ROs over which the first preamble is received is associated with a first preamble sequence group among a plurality of preamble sequence groups, wherein the first preamble sequence group is associated with a first UE downlink receive capability level and a second preamble sequence group among the first plurality of preamble sequence groups is associated with a second UE downlink receive capability level that is higher than the first UE downlink receive capability level, receive, from a second UE, a second preamble associated with a second RACH procedure over a second set of ROs among the plurality of sets of ROs, wherein the second set of ROs over which the second preamble is received is associated with a third preamble sequence group among a second plurality of preamble sequence groups, wherein the third preamble sequence group is associated with the first UE downlink receive capability level and a fourth preamble sequence group among the second plurality of preamble sequence groups is associated with the second UE downlink receive capability level, and transmit, to the first and second UEs in response to the first and second preambles, a group common (GC)-downlink control information (DCI) communication that is scrambled using a common random access radio network temporary identifier (RA-RNTI), wherein the GC-DCI communication includes information targeted to both the first and second UEs.

In an aspect of the disclosure, a method, a computer-readable medium, and an apparatus are provided. The apparatus may be a UE. The UE may identify a set of random access channel (RACH) opportunities (ROs) over which to transmit a preamble associated with a RACH procedure, transmit the preamble on the identified set of ROs, and transmit, before a response to the preamble is received, an uplink message associated with the RACH procedure on a set of physical uplink shared channel (PUSCH) opportunities (POs), wherein the uplink message includes information indicative of a first downlink receive capability level associated with the UE.

In another aspect of the disclosure, a method, a computer-readable medium, and an apparatus are provided. The apparatus may be a base station. The base station may receive, from a first user equipment (UE), a first preamble associated with a first random access channel (RACH) procedure over a first set of ROs among a plurality of sets of RACH opportunities (ROs), and receive, before a response to the preamble is transmitted, an uplink message associated with the RACH procedure on a set of physical uplink shared channel (PUSCH) opportunities (POs), wherein the uplink message includes information indicative of a first downlink receive capability level associated with the UE.

Aspects generally include a method, apparatus, system, computer program product, non-transitory computer-readable medium, user equipment, cIoT user equipment, base station, wireless communication device, and/or processing system as substantially described with reference to and as illustrated by the drawings, and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
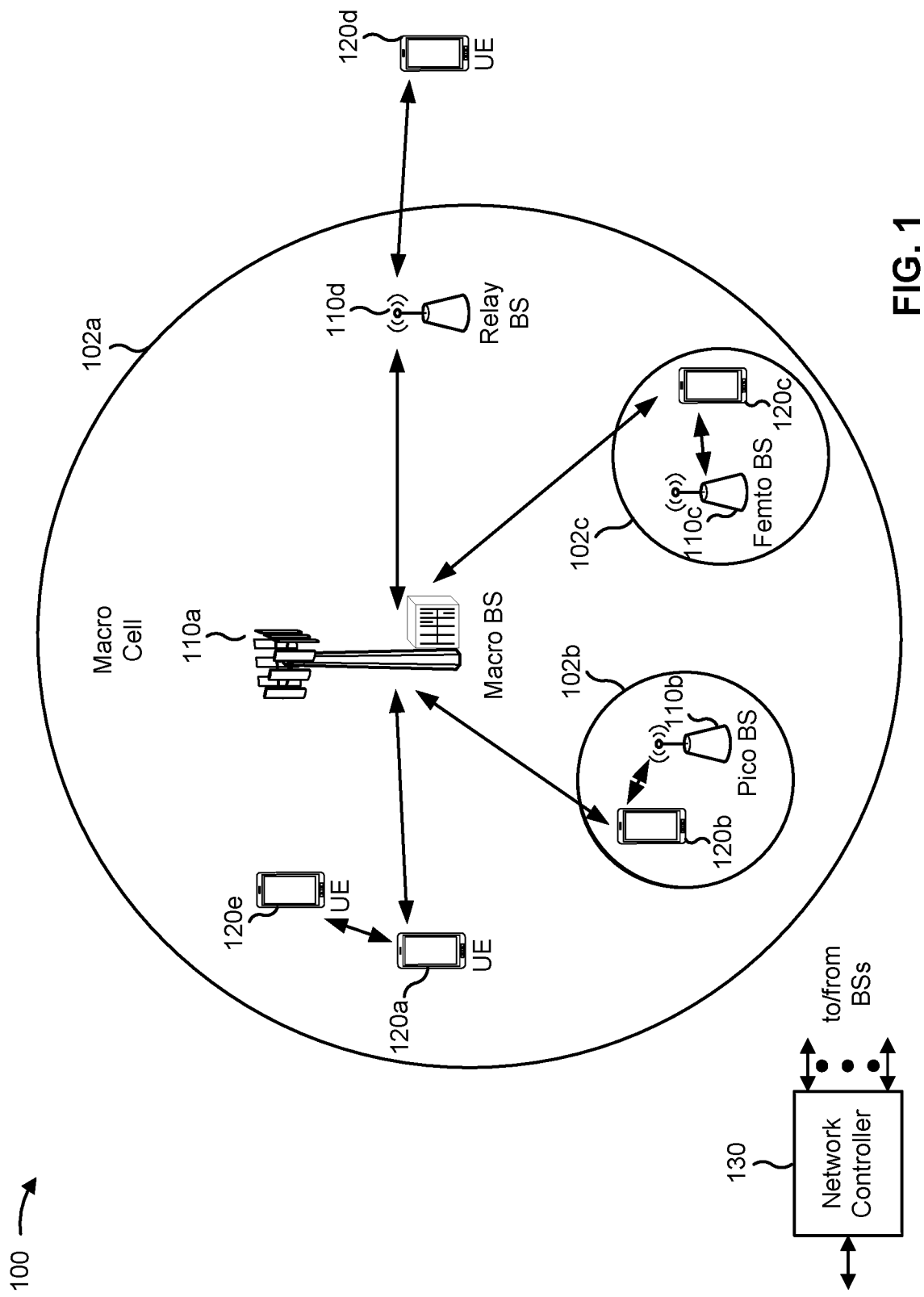
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a wireless network 100 in which aspects of the present disclosure may be practiced. The wireless network 100 may be an LTE network or some other wireless network, such as a 5G network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. "MTC" may refer to MTC or eMTC. MTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. IoT UEs, eMTC UEs, coverage enhancement (CE) mode UEs, bandwidth-limited (BL) UEs, and other types of UEs that operate using diminished power consumption relative to a baseline UE may be referred to herein as cellular IoT (cIoT) UEs. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Access to the air interface may be controlled, for example, using a unified access control (UAC) system in which UEs are associated with an access identity (e.g., an access class and/or the like), which may aim to ensure that certain high-priority UEs (e.g., emergency response UEs, mission critical UEs, and/or the like) can access the air interface even in congested conditions. Updates to the UAC parameters (e.g., priority levels associated with access identities, which access identities are permitted to access the air interface, and/or the like) may be provided for cIoT UEs using a message, such as a paging message or a direct indication information, which may conserve battery power of cIoT UEs.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples may differ from what is described with regard to FIG. 1.

Figure 2:
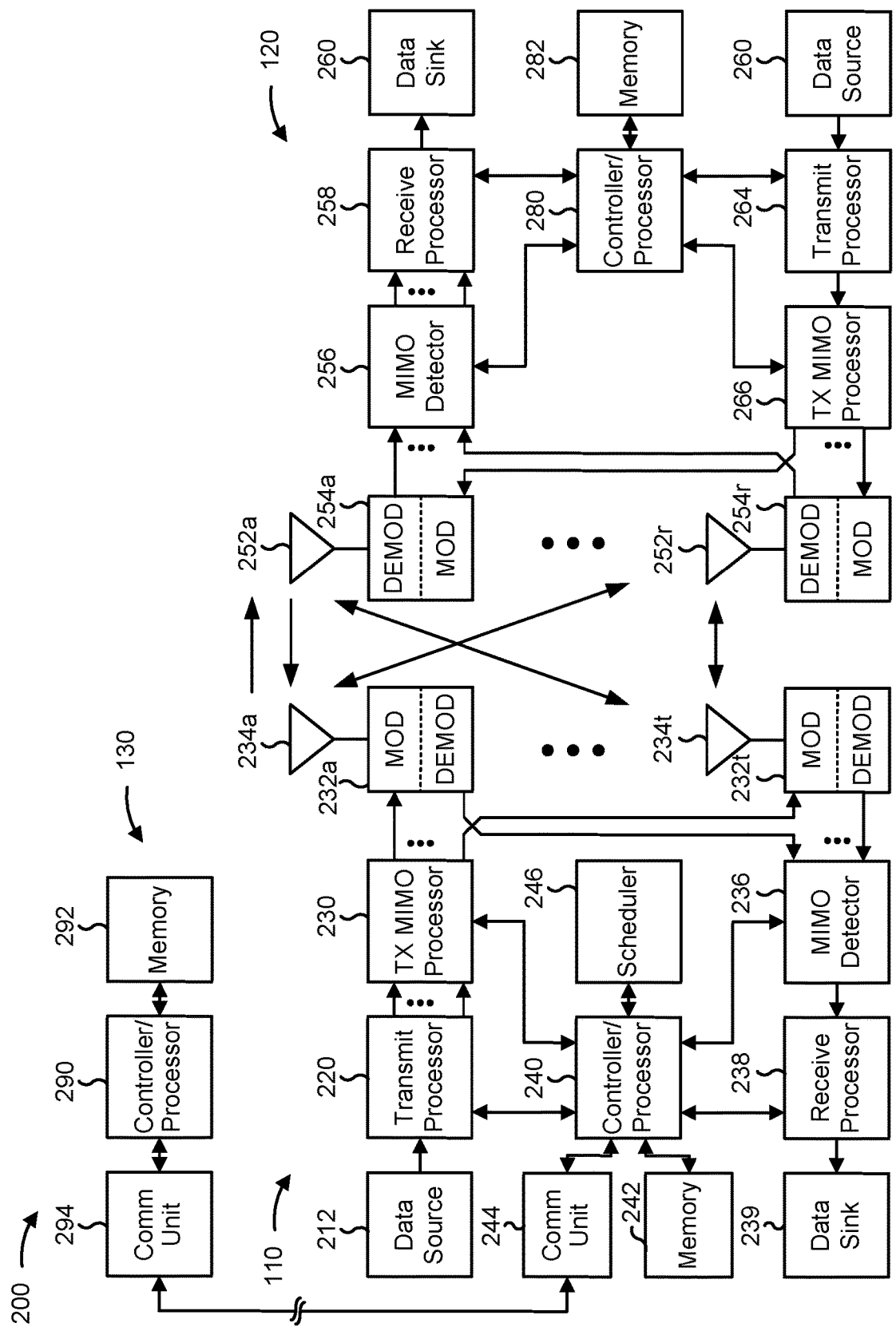
FIG. 2 is a diagram illustrating an example of a base station in communication with a UE in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency divisional multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), a reference signal received quality (RSRQ), a channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with UAC parameter updating, as described in more detail elsewhere herein. For example, controller/processor 240 of base station 110, controller/processor 280 of UE 120, and/or any other component(s) of FIG. 2 may perform or direct operations of various processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

As noted above, various device types may be characterized as UEs. Starting in 3GPP Rel. 17, a number of these UE types are being allocated a new UE classification denoted as 'NR-Light'. Examples of UE types that fall under the NR-Light classification include wearable devices (e.g., smart watches, etc.), industrial sensors, video cameras (e.g., surveillance cameras, etc.), and so on. Generally, the UE types grouped under the NR-Light classification are associated with lower communicative capacity. For example, relative to 'normal' UEs (e.g., UEs not classified as NR-Light), NR-Light UEs may be limited in terms of maximum bandwidth (e.g., 5 MHz, 10 MHz, 20 MHz, etc.), maximum transmission power (e.g., 20 dBm, 14 dBm, etc.), number of receive antennas (e.g., 1 receive antenna, 2 receive antennas, etc.), and so on. Some NR-Light UEs may also be sensitive in terms of power consumption (e.g., requiring a long battery life, such as several years) and may be highly mobile. Moreover, in some designs, it is generally desirable for NR-Light UEs to co-exist with UEs implementing protocols such as eMBB, URLLC, LTE NB-IoT/MTC, and so on.

Figure 3:
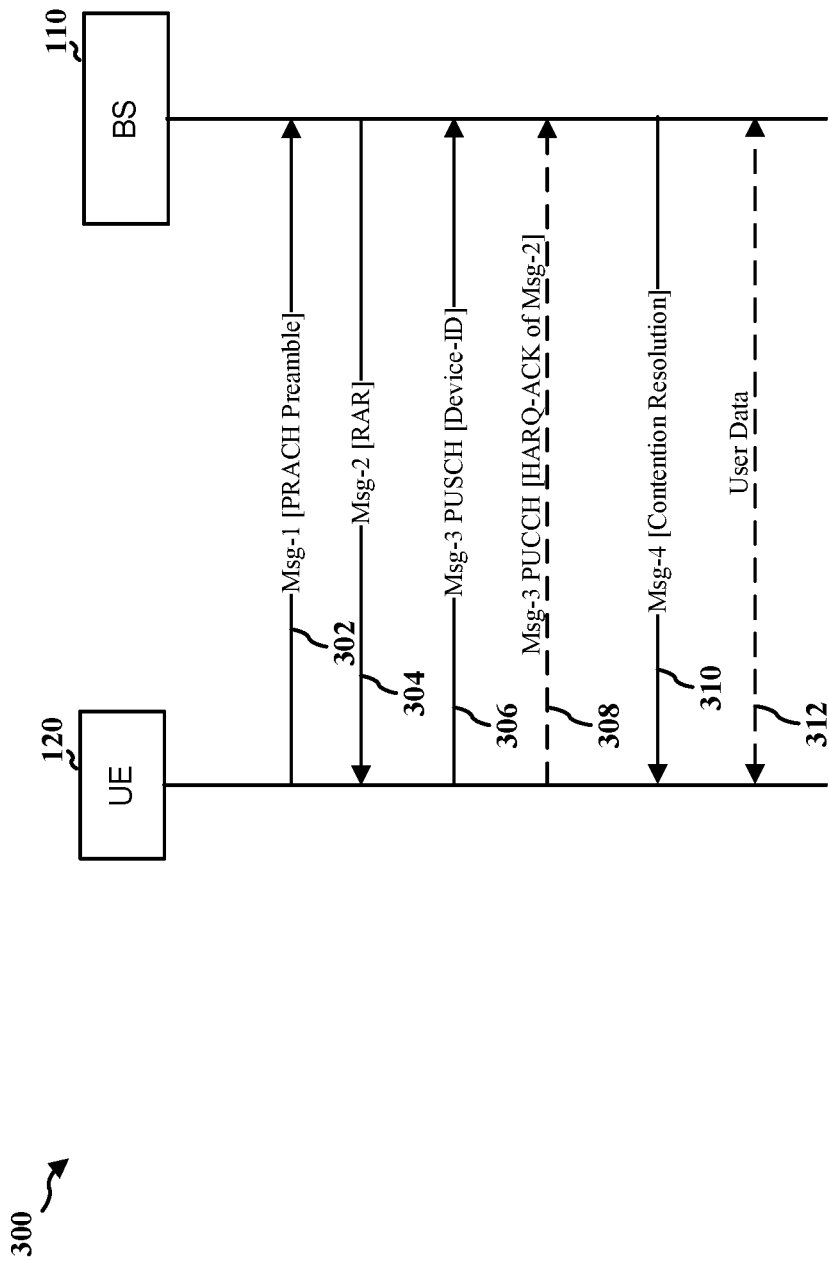
FIG. 3 illustrates a 4-Step Physical Random Access Channel (PRACH) procedure in accordance with an embodiment of the disclosure.

FIG. 3 illustrates a 4-Step Physical Random Access Channel (PRACH) procedure 300 in accordance with an embodiment of the disclosure. The 4-Step PRACH procedure 300 is an initial access procedure by which a UE (e.g., UE 120) can initiate communication with a BS (e.g., BS 110).

Referring to FIG. 3, at 302, a Message 1 ("Msg-1") of the 4-Step PRACH procedure 300 is transmitted by UE 120 to BS 110. The Msg-1 of 302 may be characterized herein as a PRACH preamble. In an example, the Msg-1 of 302 may be implemented a Zadoff-Chu sequence which indicates the presence of a random access attempt and allows BS 110 to estimate between BS 110 and UE 120.

Referring to FIG. 3, at 304, a Message 2 ("Msg-2") of the 4-Step PRACH procedure 300 is transmitted by BS 110 to UE 120. The Msg-2 of 304 may be characterized herein as a random access response (RAR). For example, in response to the detected PRACH preamble (or Msg-1) at 302, BS 110 may transmit the Msg-2 of 304 on a downlink (DL) shared channel (SCH) comprising any combination of:

An index of the detected PRACH preamble (or Msg-1) from 302,
An uplink timing correction for UE 120,
A scheduling grant indicating what resource(s) UE 120 should use for transmission of Message 3 ("Msg-3") of the 4-Step PRACH procedure 300, and
A Temporary Cell Radio Network Temporary Identifier (TC-RNTI) used for further communication between UE 120 and BS 110.

In an example, the Msg-2 of 304 may be scheduled on the SL SCH and indicated on a Physical Downlink Control Channel (PDCCH) using an identity (e.g., a Random Access RNTI (RA-RNTI) which is indicated by the time and frequency resource(s) upon which the PRACH preamble (or Msg-1) from 302 is transmitted.

Referring to FIG. 3, at 306, a Message 3 ("Msg-3") comprising at least a UE identifier (ID) of UE 120 is transmitted by UE 120 to BS 110. In some designs, the Msg-3 is transmitted over Physical Uplink Shared Channel (PUSCH) and may be referred to as a Msg-3 PUSCH. In an example, the Msg-3 transmitted at 306 may be transmitted via the UL SCH resource(s) indicated by the Msg-2 from 304. In some designs, device scrambling is used for the transmission of Msg-3 at 306 (e.g., scrambling based on the TC-RNTI assigned via the Msg-2 from 304). In some designs, if UE 120 is in a radio resource control (RRC)-Connected state with a C-RNTI already assigned thereto, the C-RNTI may be used as the UE-ID in the Msg-3 at 306. In some designs, if UE 120 is not in a RRC-Connected state, a core network device identifier such as a 40-bit Serving Temporary Mobile Subscriber Identity (S-TMSI) can be used as the UE-ID in the Msg-3 at 306.

Referring to FIG. 3, at 308, another Msg-3 is optionally transmitted as a hybrid automatic repeat request (HARQ) acknowledgment (ACK) to the Msg-2 from 304. In some designs, the Msg-3 is transmitted via PUCCH and may be referred to as a Msg-3 PUCCH. In some designs, whether or not the Msg-3 PUCCH is transmitted at 308 may be configured via RRC signaling or via one or more information elements (IEs) in a system information block (SIB).

Referring to FIG. 3, at 308, a Message 4 ("Msg-4") of the 4-Step PRACH procedure 300 is transmitted by BS 110 to UE 120. In some designs, the Msg-4 of 308 comprises a downlink message for contention resolution as there is some probability of contention associated with the Msg-3 transmissions at 306-308. For example, if multiple UEs transmit the same Msg-1 (302) at the same time, then the multiple UEs may react to the same Msg-2 (304) such that a collision occurs. In some designs, if UE 120 already has a C-RNTI assigned, contention resolution may be handled by addressing UE 120 on the PDCCH using the C-RNTI. In some designs, if UE 120 does not have a valid C-RNTI (e.g., UE 120 is RRC-Idle prior to 302), Msg-4 contention resolution may be handled by addressing UE 120 on the PDCCH using the TC-RNTI, with UE 120 comparing (i) the UE-ID received within a PDSCH scheduled by the PDCCH of Msg-4 with (ii) the UE-ID transmitted in the Msg-3 PUSCH at 306, so as to determine the 4-Step PRACH procedure 300 successful if a match is observed, after which the C-RNTI is confirmed as C-RNTI. At 312, UE 120 and BS 110 may optionally exchange user data.

Figure 4:
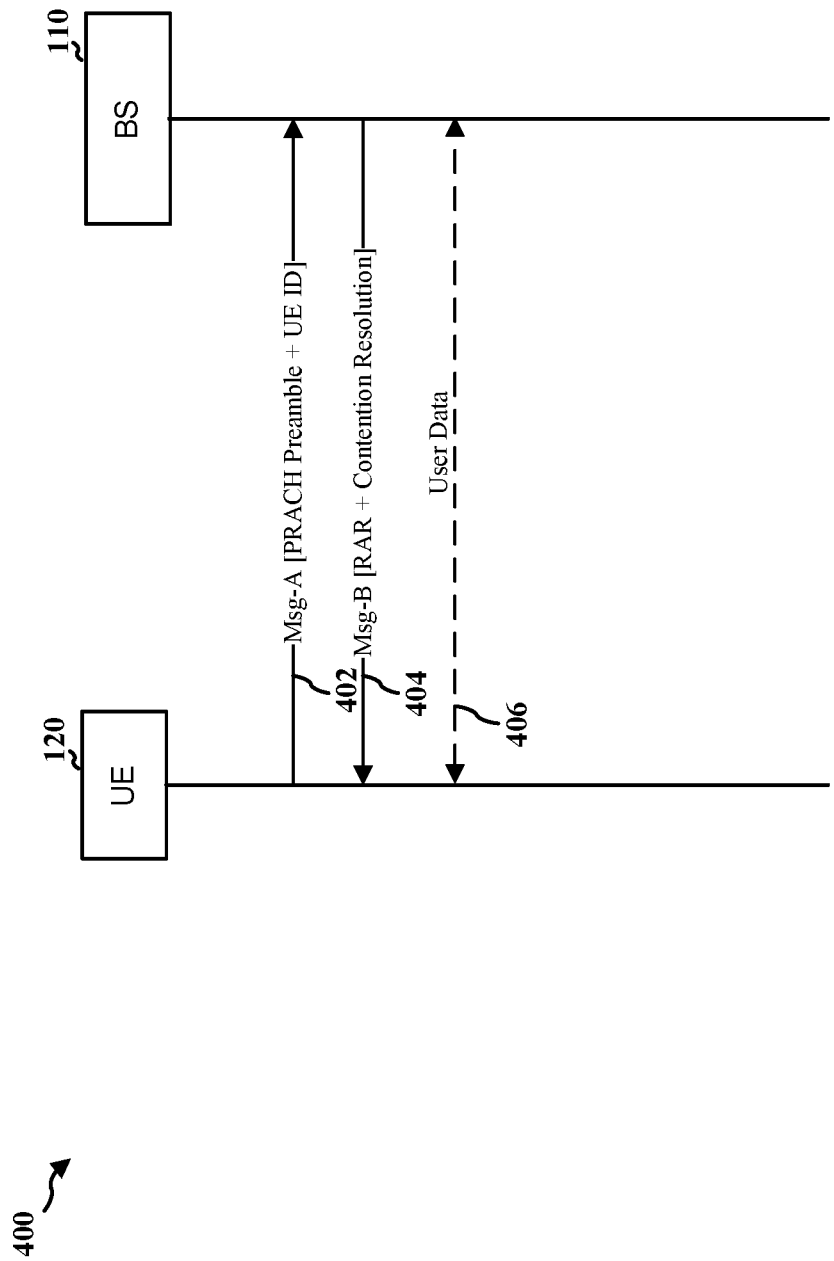
FIG. 4 illustrates a 2-Step PRACH procedure in accordance with an embodiment of the disclosure.

FIG. 4 illustrates a 2-Step PRACH procedure 400 in accordance with an embodiment of the disclosure. Similar to the 4-Step PRACH procedure 300, the 2-Step PRACH procedure 400 is an initial access procedure by which a UE (e.g., UE 120) can initiate communication with a BS (e.g., BS 110). However, in the 2-Step PRACH procedure 400, the Msg-1 and Msg-3 are transmitted to the BS 110 before any response from the BS 110 is transmitted as 'Msg-A', and the BS 110 sends 'Msg-b' (e.g., comprising Msg-2 and Msg-4) back to the UE 120.

Referring to FIG. 4, at 402, UE 120 transmits Msg-A (e.g., a PRACH preamble and associated UE ID information as in Msg-1 and Msg-3) to BS 110. At 404, BS 110 transmits Msg-B (e.g., a RAR along with contention resolution as in Msg-2 and Msg-4) to BS 110. At 406, UE 120 and BS 110 may optionally exchange user data. The processing of the Msg-A and Msg-B is otherwise comparable to the processing of the Msg-1, Msg-2, Msg-3 and Msg-4 in the 4-Step PRACH procedure 300 of FIG. 3.

Figure 5:
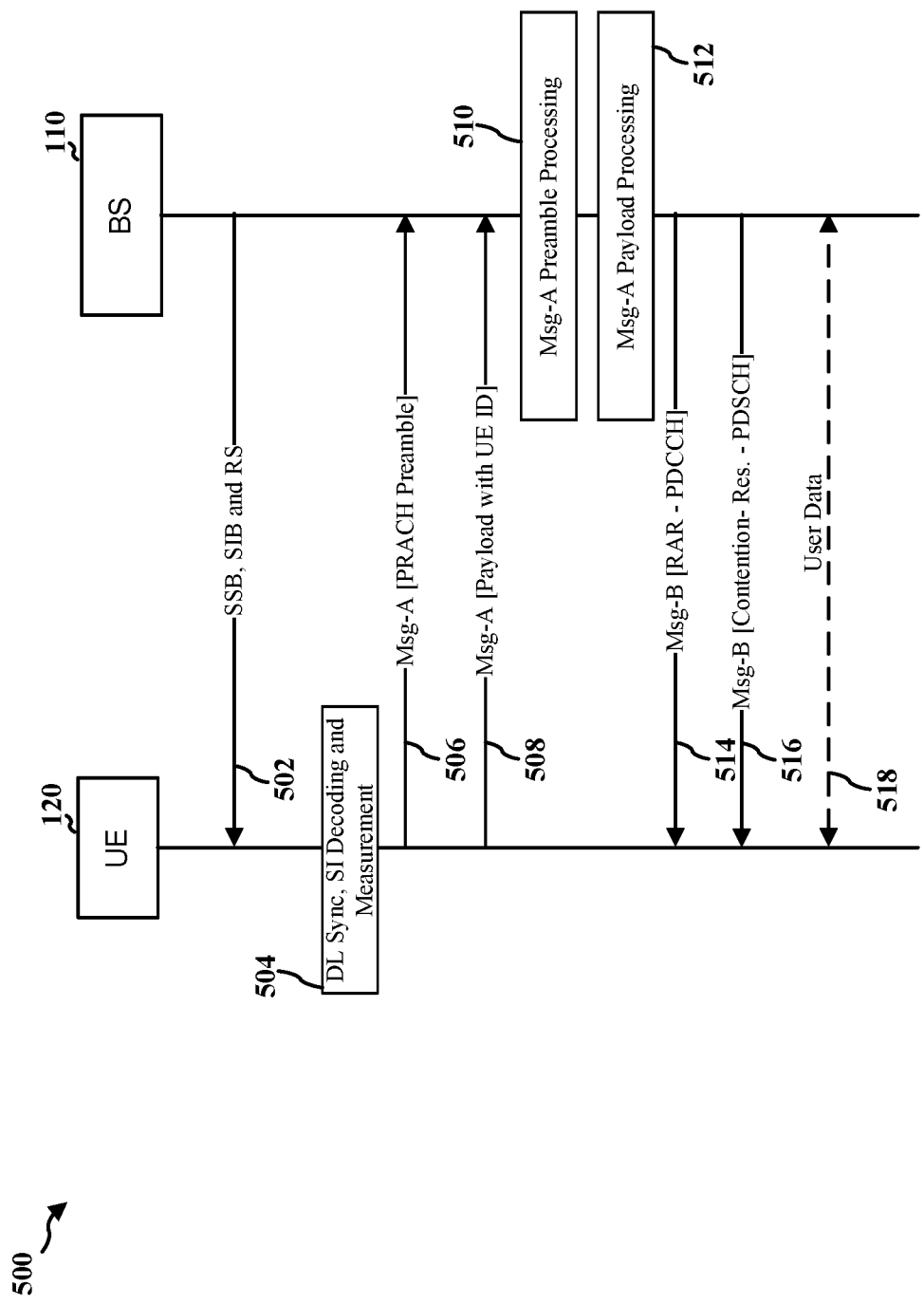
FIG. 5 illustrates a 2-Step PRACH procedure in accordance with another embodiment of the disclosure.

FIG. 5 illustrates a 2-Step PRACH procedure 500 in accordance with another embodiment of the disclosure. In particular, the 2-Step PRACH procedure 500 is a more detailed implementation of the 2-Step PRACH procedure 400 of FIG. 5.

At 502, BS 110 transmits information to UE 120, including a system synchronization block (SSB), a system information block (SIB), and a reference signal (RS). At 504, UE 120 performs downlink synchronization, system information (SI) decoding and one or more measurements on the transmitted information. At 506, UE 120 transmits a PRACH preamble component of Msg-A to BS 110. At 508, UE 120 transmits a payload component (e.g., comprising UE ID information as in Msg-3) of Msg-A to BS 110. At 510, BS 110 processes the PRACH preamble component of Msg-A. At 512, BS 110 processes the payload component of Msg-A. At 514, BS 110 transmits a RAR via PDCCH, similar to Msg-2. At 516, BS 110 transmits contention resolution information via PDCCH, similar to Msg-4. At 518, UE 120 and BS 110 may optionally exchange user data.

Figure 6:
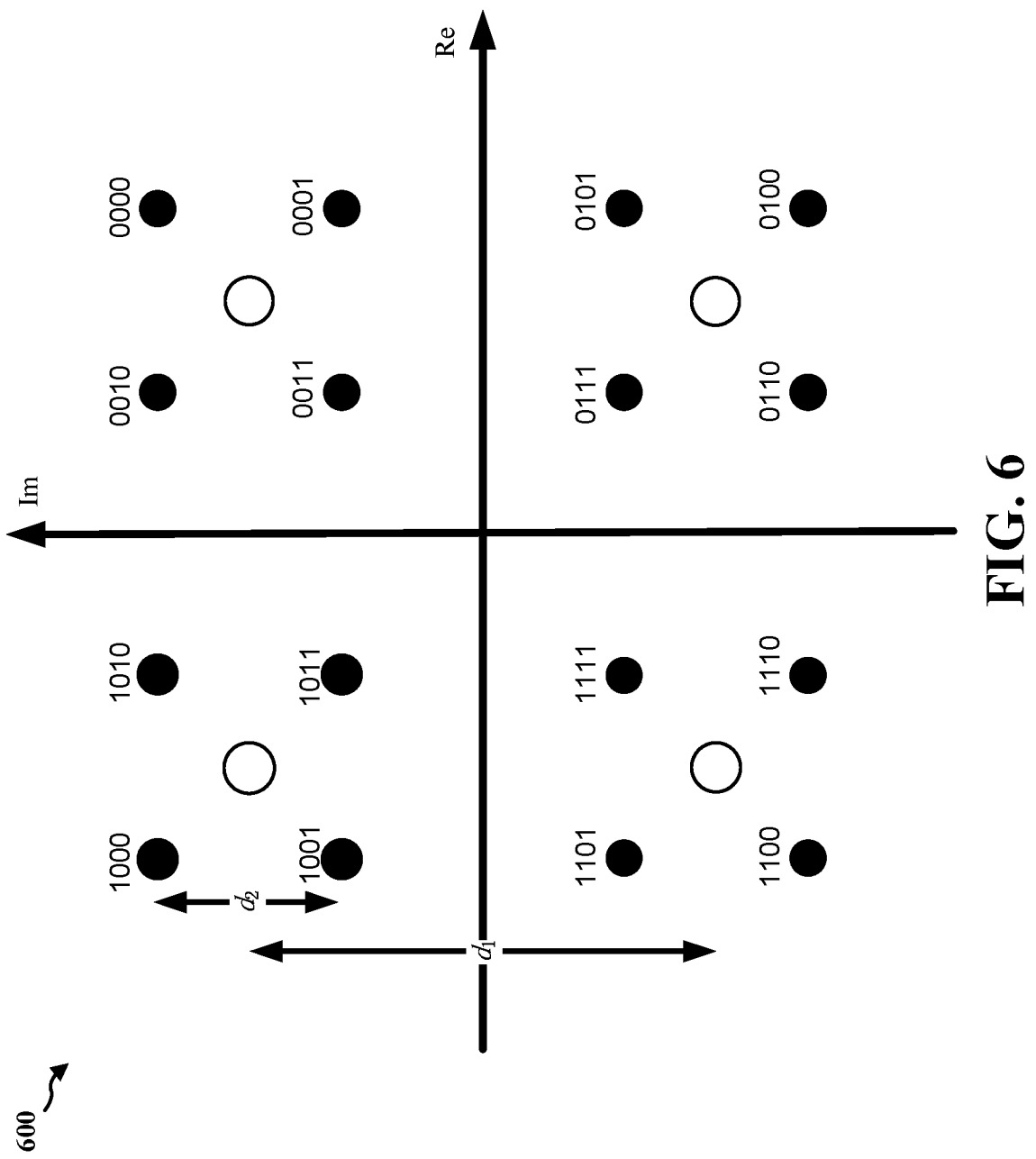
FIG. 6 illustrates an example of a Msg-A mapping scheme in accordance with an embodiment of the disclosure.

Starting in 3GPP Rel. 14, multi-user superposition transmission (MUST) was introduced to enhance PDSCH capacity in the symbol domain. FIG. 6 illustrates a MUST-based symbol coding example in accordance with an embodiment of the disclosure. In FIG. 6, $d_1$ denotes a symbol spacing between modulation symbols targeted to a far-UE with lower channel gain, and $d_2$ denotes a symbol spacing between modulation symbols targeted to a near-UE with higher channel gain. Given the respective UEs' QoS requirements, $\lambda=d_1/d_2$ can be adjusted to allocate different power ratio between the near-UE and far-UE.

Figure 7:
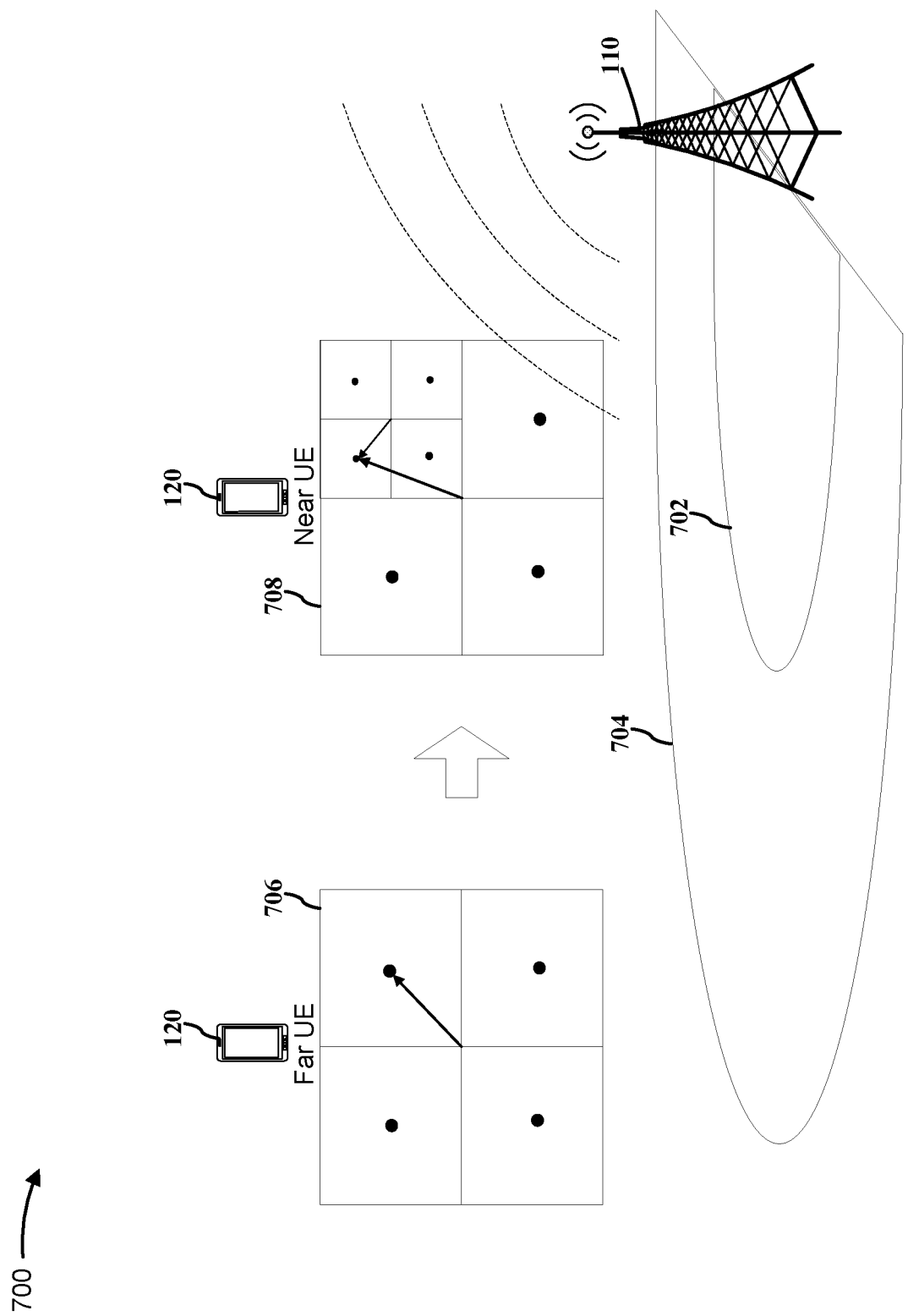
FIG. 7 illustrates a MUST-based transmission in accordance with an embodiment of the disclosure.

FIG. 7 illustrates a MUST-based transmission 700 in accordance with an embodiment of the disclosure. In FIG. 7, the near-UE is located in inner cell coverage area 702, while the far-UE is located in outer cell coverage area 704. The near-UE's symbol component is transparent to the demodulation of the far-UE's symbol as shown at 706. By contrast, the near-UE can cancel out the far-UE's modulated signal to decode its own signal as shown at 708. In an example, the modulation order and power ratio between pairing of the far-UE and the near-UE can be indicated via DCI, and the near-UE can use this information to perform the cancellation of the far-UE's signal. In accordance with 3GPP Rel. 14, the near-UE would assume that a single far-UE with identical modulation order is MUSTed on top of its own signal, within the whole PDSCH wideband.

In a scenario where UE 120 corresponds to a particular class of UE, such as an NR-Light UE, it is possible that Msg-1 preamble of 302 or the Msg-A preamble of 402 of FIG. 4 or 506 of FIG. 5 is successfully received at BS 110, but the RAR (e.g., Msg-2 or Msg-B RAR on PDCCH) is not successfully received at the UE. For example, so-called 'premium' UEs may comprise more receivers (e.g., 2, 4, etc.) than a low-tier UE (e.g., NR-Light UE, which may comprise 1 or 2 receivers). In this case, it is possible for a low-tier UE that requires RAR repetitions to be paired with (or MUSTed with) a premium UE that does not require RAR repetitions.

One or more embodiments of the disclosure are directed to various 2-Step or 4-Step RACH procedures, which, in some designs, may be used for scenarios where a UE belonging to a first UE class (e.g., NR-Light UE or any UE with a number of receivers below a threshold) is treated as a virtual far-UE, while being MUSTed with a UE belonging to a second UE class (e.g., a premium UE or any UE with a number of receivers that is not below the threshold) that is treated as a virtual near-UE. In some designs, a plurality of preamble sequence groups is associated with a set of ROs, whereby each respective preamble sequence group is associated with a different repetition level for a downlink message (e.g., Msg-B RAR or Msg-2 RAR). For example, in some designs, orthogonal resources might be scheduled for NR-Light UEs who need DL repetitions and for premium UEs who do not need DL repetitions. In some designs, the various embodiments described below are implemented with respect to UEs that belong to a particular UE class (e.g., UEs with limited downlink receive capability, such as NR-Light UEs). In some designs, one or more of the embodiments described below may be implemented with respect to NR-Light UEs where UE-specific reference signals are not available. As used herein, a "set" of ROs refers to a grouping of one or more ROs.

Figure 8:
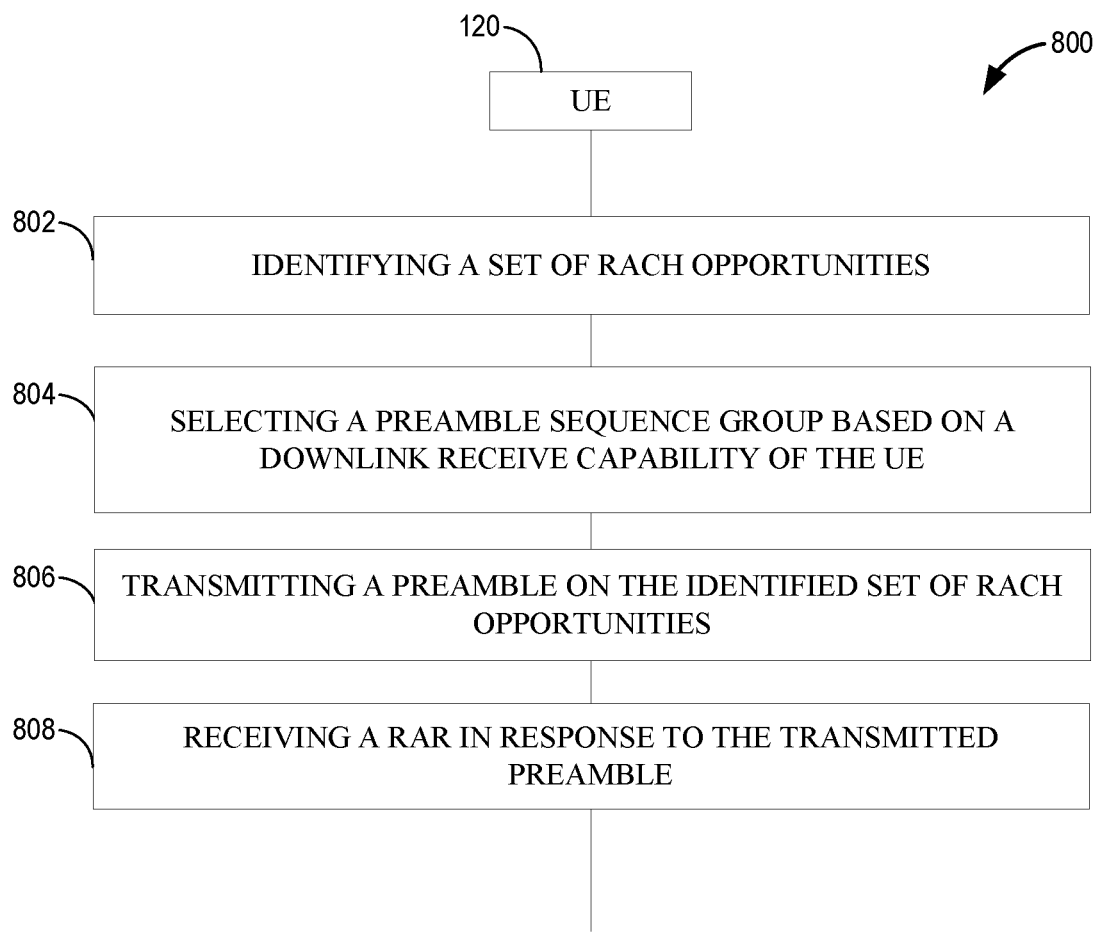
FIG. 8 illustrates an exemplary process of wireless communications according to an aspect of the disclosure.

FIG. 8 illustrates an exemplary process 800 of wireless communications according to an aspect of the disclosure. The process 800 of FIG. 8 is performed by UE 120. The UE performing the process 800 of FIG. 8 may belong to either the first UE class (e.g., a class of UE limited in terms of downlink receive capability, such as an NR-Light UE with a number of receivers that is below a threshold) or the second UE class (e.g., a UE that is equipped with a higher downlink receive capability, such as a premium UE with a number of receivers that is at least equal to the threshold).

At 802, UE 120 (e.g., controller/processor 240) identifies a set of ROs over which to transmit a preamble (e.g., a Msg-1 preamble for a 4-Step RACH procedure, or Msg-A preamble for a 2-Step RACH procedure) associated with a RACH procedure. In an example, the identification of 802 may comprise a selection of a set of ROs among a plurality of sets of ROs based on one or more signal reception quality measurements. For example, the plurality of sets of ROs may comprise a first set of ROs dedicated to a first UE class (e.g., UEs with limited downlink receive capability such as NR-Light UEs) and a second set of ROs shared between the first UE class and a second UE class (e.g., UEs that do not have the downlink receive capability associated with the first UE class). In an example, the identification of 802 may comprise a selection that is based on a relationship between the one or more signal reception quality measurements and at least one signal reception quality measurement threshold. For example, at 802, the first set of ROs may be selected if the one or more signal reception quality measurements are less than the at least one signal reception quality measurement threshold, and the second set of ROs may be selected if the one or more signal reception quality measurements are not less than the at least one signal reception quality measurement threshold. In this case, in an example, lower-performing UEs of the first UE class may select the first set of ROs, while higher-performing UEs of the first UE class may select the second set of ROs. In some designs, the at least one signal reception quality measurement threshold is pre-defined (e.g., in the relevant 3GPP standard), while in other designs the at least one signal reception quality measurement threshold is configured dynamically (e.g., via a SIB such as SIB1 or via RRC signaling). In other designs, the set of ROs can be identified at 802 in some other manner and need not be based upon the one or more signal reception quality measurements.

At 804, UE 120 (e.g., controller/processor 280) selects a first preamble sequence group from among a plurality of preamble sequence groups associated with the identified set of ROs based on a downlink receive capability of the UE, wherein the first preamble sequence group is associated with a first UE downlink receive capability level and a second preamble sequence group among the plurality of preamble sequence groups is associated with a second UE downlink receive capability level that is different than the first UE downlink receive capability level. In an example, the downlink receive capability of the UE may be based on a number of associated receivers equipped on the UE relative to a receive antenna threshold (e.g., one of the preamble sequence groups is selected if the UE includes a number of receive antennas that is below a receive antenna threshold, and the other preamble sequence group is selected if the UE includes a number of receive antennas that is not below the receive antenna threshold). In some designs, the first preamble sequence group is associated with a first random access radio network temporary identifier (RA-RNTI) and the second preamble sequence group is associated with a second RA-RNTI that is different than the first RA-RNTI. In an example, selection of the first preamble sequence group may trigger a RAR to the preamble to be scrambled using the first RA-RNTI. In some designs, the association between each of the plurality of preamble sequence groups and its respective downlink receive capability for the RAR is predefined (e.g., in the relevant 3GPP standard). In other designs, information indicative of the association between each of the plurality of preamble sequence groups and its respective downlink receive capability for the RAR is received from a base station (e.g., via radio resource control (RRC) signaling or SIB).

At 806, the UE 120 (e.g., antenna(s) 252a . . . 252r, TX MIMO processor 266, modulators(s) 254a . . . 254r, TX processor 264) transmits the preamble on the identified group of ROs. In an example, the preamble transmitted at 806 may correspond to a Msg-A preamble of a 2-Step PRACH procedure, or alternatively to a Msg-1 preamble of a 4-Step PRACH procedure. In some designs, the preamble of 806 may be configured to indicate to the UE's downlink receive capability to the base station (e.g., so that an appropriate number of RAR repetitions can be signaled to the UE).

At 808, the UE 120 (e.g., 252a . . . 252r, demodulators(s) 254a . . . 254a, MIMO detector 256, RX processor 258) receives, in response to the transmitted preamble, a RAR. In an example, the RAR may correspond to as Msg-A RAR on the PDDCH of a 2-Step PRACH procedure, or alternatively to a Msg-2 RAR on the PDDCH of a 4-Step PRACH procedure. In an example, if the UE corresponds to the first UE class (e.g., NR-Light UE), then the first preamble sequence group may be associated with a legacy RA-RNTI that is compatible with UEs associated with either the first UE downlink receive capability level or the second UE downlink receive capability level. In an alternative example, if the UE corresponds to the second UE class (e.g., premium UE), the first preamble sequence group may be associated with a new RA-RNTI that is compatible with UEs associated with the first UE downlink receive capability level and is incompatible with UEs associated with the second UE downlink receive capability level.

Figure 9:
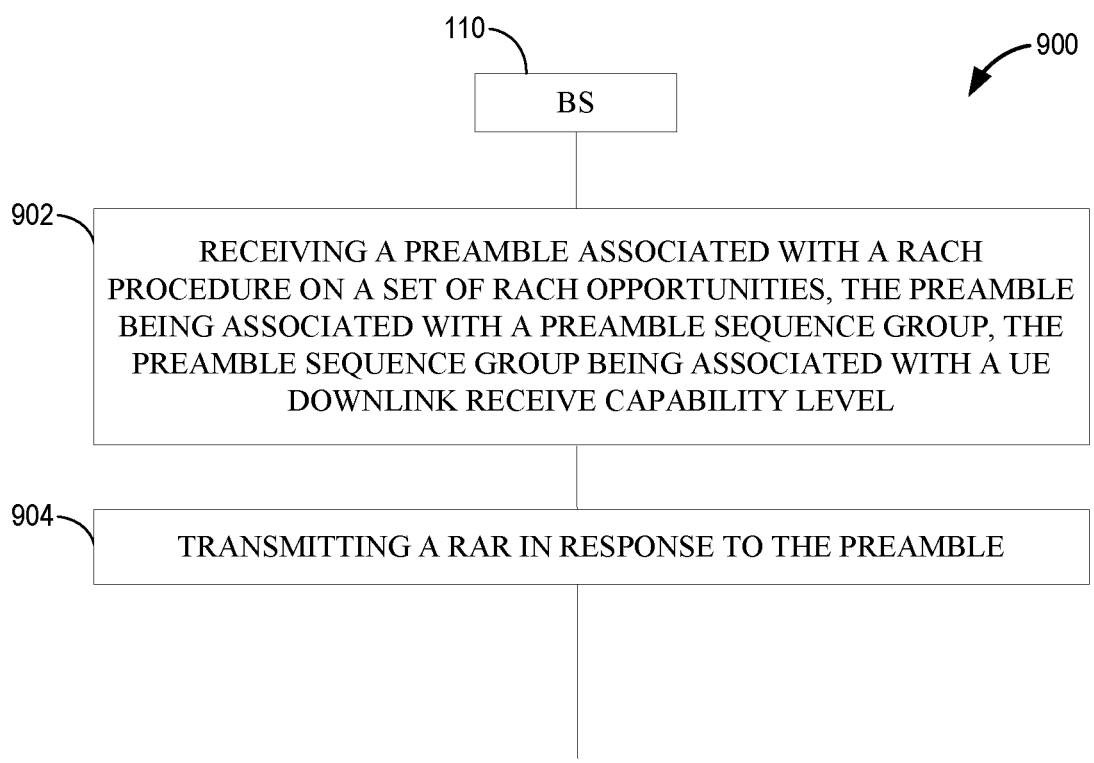
FIG. 9 illustrates an exemplary process of wireless communications according to an aspect of the disclosure.

FIG. 9 illustrates an exemplary process 900 of wireless communications according to an aspect of the disclosure. The process 900 of FIG. 9 is performed by BS 110.

At 902, BS 110 (e.g., antenna(s) 234a . . . 234t, demodulators(s) 232a . . . 232a, MIMO detector 236, RX processor 238) receives, from a UE, a preamble associated with a RACH procedure over one of a plurality of sets of ROs, wherein the set of ROs over which the preamble is received is associated with a first preamble sequence group among a plurality of preamble sequence groups, wherein the first preamble sequence group is associated with a first UE downlink receive capability level and a second preamble sequence group among the plurality of preamble sequence groups is associated with a second UE downlink receive capability level that is different than the first UE downlink receive capability level. In an example, the preamble received at 902 may correspond to a Msg-A preamble of a 2-Step PRACH procedure, or alternatively to a Msg-1 preamble of a 4-Step PRACH procedure. In some designs, the preamble of 902 may be configured to indicate to the UE's downlink receive capability to the base station (e.g., so that an appropriate number of RAR repetitions can be signaled to the UE). The UE from which the preamble is received may correspond to either the first UE class or the second UE class.

At 904, BS 110 (e.g., antenna(s) 234a . . . 234t, modulators(s) 232a . . . 232a, TX MIMO processor 230, TX processor 220) transmits, in response to the preamble, a RAR to the UE. In an example, the RAR may correspond to as Msg-A RAR on the PDDCH of a 2-Step PRACH procedure, or alternatively to a Msg-2 RAR on the PDDCH of a 4-Step PRACH procedure. In an example, if the UE corresponds to the first UE class (e.g., NR-Light UE), then the first preamble sequence group may be associated with a legacy RA-RNTI that is compatible with UEs associated with either the first UE downlink receive capability level or the second UE downlink receive capability level. In an alternative example, if the UE corresponds to the second UE class (e.g., premium UE), the first preamble sequence group may be associated with a new RA-RNTI that is compatible with UEs associated with the first UE downlink receive capability level and is incompatible with UEs associated with the second UE downlink receive capability level.

Referring to FIGS. 8-9, in some designs, a second set of ROs is associated with a second plurality of preamble sequence groups, and each of the second plurality of preamble sequence groups may be associated with a different RA-RNTI. In an example, the RA-RNTIs associated with the plurality of preamble sequence groups (i.e., associated with the set of ROs identified at 802) may be the same or different from the RA-RNTIs associated with the second plurality of preamble sequence groups.

Figure 10:
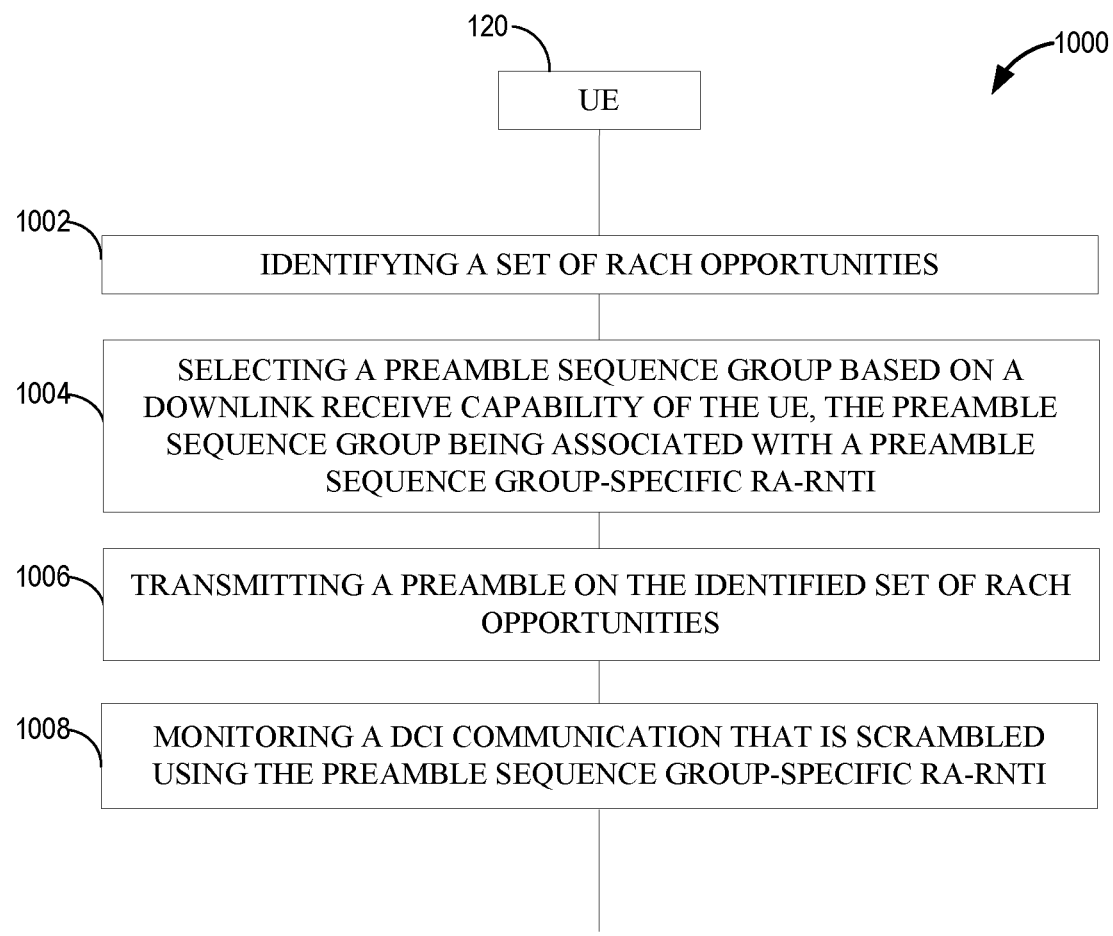
FIG. 10 illustrates an exemplary process of wireless communications according to an aspect of the disclosure.

FIG. 10 illustrates an exemplary process 1000 of wireless communications according to an aspect of the disclosure. The process 1000 of FIG. 10 is performed by UE 120. In an example, the UE performing the process 1000 of FIG. 10 may belong to the second UE class (e.g., a UE that is equipped with a higher downlink receive capability, such as a premium UE with a number of receivers that is at least equal to the threshold).

At 1002, UE 120 (e.g., controller/processor 240) identifies a set of ROs over which to transmit a preamble (e.g., a Msg-1 preamble for a 4-Step RACH procedure, or Msg-A preamble for a 2-Step RACH procedure) associated with a RACH procedure. In some designs, UE 120 may select a set of ROs that is associated with the second UE class (e.g., although the identified set of ROs may also be used by UEs in the first UE class that currently have good signal performance).

At 1004, UE 120 (e.g., controller/processor 280) selects a first preamble sequence group from among a plurality of preamble sequence groups associated with the identified first set of ROs based on a downlink receive capability of the UE. The first preamble sequence group is associated with a first UE downlink receive capability level and a second preamble sequence group among the plurality of preamble sequence groups is associated with a second UE downlink receive capability level that is lower than the first UE downlink receive capability level. Hence, the UE selects the first preamble sequence group because, in the example of FIG. 10, UE 120 is a premium UE that belongs to the second UE class, such that the downlink receive capability is high (or above a threshold). The first preamble sequence group may further be associated with a first RA-RNTI and the second preamble sequence group may be associated with a second RA-RNTI that is different than the first RA-RNTI. In an example, selection of the first preamble sequence group may trigger a DCI communication and/or a RAR to the preamble to be scrambled using the first RA-RNTI. In some designs, the association between each of the plurality of preamble sequence groups and its respective downlink receive capability for the RAR is pre-defined (e.g., in the relevant 3GPP standard). In other designs, information indicative of the association between each of the plurality of preamble sequence groups and its respective downlink receive capability for the RAR is received from a base station (e.g., via radio resource control (RRC) signaling or SIB).

At 1006, the UE 120 (e.g., antenna(s) 252a . . . 252r, TX MIMO processor 266, modulators(s) 254a . . . 254r, TX processor 264) transmits the preamble on the identified group of ROs. In an example, the preamble transmitted at 1006 may correspond to a Msg-A preamble of a 2-Step PRACH procedure, or alternatively to a Msg-1 preamble of a 4-Step PRACH procedure. In some designs, the preamble of 1006 may be configured to indicate to the UE's downlink receive capability to the base station (e.g., so that an appropriate number of RAR repetitions can be signaled to the UE).

At 1008, the UE 120 (e.g., 252a . . . 252r, demodulators(s) 254a . . . 254a, MIMO detector 256, RX processor 258) monitors, in response to the transmitted preamble, a DCI communication that is scrambled using the first RA-RNTI. In an example, the DCI is a group common (GC)-DCI that is associated with the first set of ROs and a second set of ROs, and the GC-DCI indicates (i) a first set of time-domain resources for RAR to one or more UEs that transmitted one or more respective preambles on the first set of ROs, and (ii) a second set of time-domain resources for RAR to one or more UEs that transmitted one or more respective preambles on the second set of ROs. In a further example, the first and second sets of time-domain resources may be indicated based on an offset related to a time-domain resource allocation of a respective set of ROs used to transmit the associated preamble. In a further example, the offset may be based on an RO-index and an initial RO-index associated with the respective set of ROs used to transmit the associated preamble. In a further example, the first and second set of ROs may overlap in terms of frequency. In a further example, the DCI communication may comprise a set of interference parameters of a PDSCH (e.g., for cancellation of a virtual far-UE component of a MUST-based RAR transmission). In a further example, the set of interference parameters may comprise a PDSCH signal power ratio between the UE and an interference signal, a modulation order of the interference signal, a demodulation reference signal (DMRS) configuration of the UE, or any combination thereof.

Figure 11:
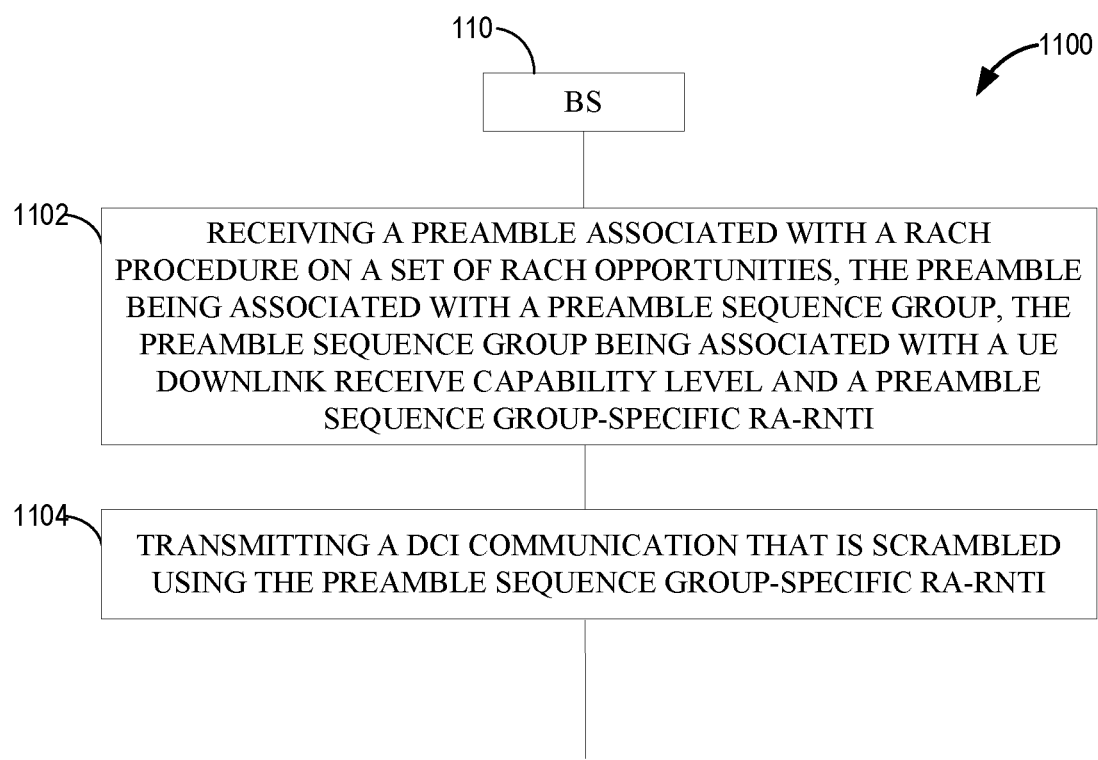
FIG. 11 illustrates an exemplary process of wireless communications according to an aspect of the disclosure.

FIG. 11 illustrates an exemplary process 1100 of wireless communications according to an aspect of the disclosure. The process 1100 of FIG. 11 is performed by BS 110.

At 1102, BS 110 (e.g., antenna(s) 234a . . . 234t, demodulators(s) 232a . . . 232a, MIMO detector 236, RX processor 238) receives, from a UE, a preamble associated with a RACH procedure over one of a plurality of sets of ROs, wherein the set of ROs over which the preamble is received is associated with a first preamble sequence group among a plurality of preamble sequence groups, wherein the first preamble sequence group is associated with a first UE downlink receive capability level and a second preamble sequence group among the plurality of preamble sequence groups is associated with a second UE downlink receive capability level that is lower than the first UE downlink receive capability level, wherein the first preamble sequence group is associated with a first RA-RNTI and the second preamble sequence group is associated with a second RA-RNTI that is different than the first RA-RNTI. In an example, the preamble received at 1102 may correspond to a Msg-A preamble of a 2-Step PRACH procedure, or alternatively to a Msg-1 preamble of a 4-Step PRACH procedure. In some designs, the preamble of 1102 may be configured to indicate to the UE's downlink receive capability to the base station (e.g., so that an appropriate number of RAR repetitions can be signaled to the UE).

At 1104, BS 110 (e.g., antenna(s) 234a . . . 234t, modulators(s) 232a . . . 232a, TX MIMO processor 230, TX processor 220) transmits, in response to the preamble, a DCI communication that is scrambled using the first RA-RNTI. In an example, the DCI is a group common GC-DCI that is associated with the first set of ROs and a second set of ROs, and the GC-DCI indicates (i) a first set of time-domain resources for RAR to one or more UEs that transmitted one or more respective preambles on the first set of ROs, and (ii) a second set of time-domain resources for RAR to one or more UEs that transmitted one or more respective preambles on the second set of ROs. In a further example, the first and second sets of time-domain resources may be indicated based on an offset related to a time-domain resource allocation of a respective set of ROs used to transmit the associated preamble. In a further example, the offset may be based on an RO-index and an initial RO-index associated with the respective set of ROs used to transmit the associated preamble. In a further example, the first and second set of ROs may overlap in terms of frequency. In a further example, the DCI communication may comprise a set of interference parameters of a PDSCH (e.g., for cancellation of a virtual far-UE component of a MUST-based RAR transmission). In a further example, the set of interference parameters may comprise a PDSCH signal power ratio between the UE and an interference signal, a modulation order of the interference signal, a DMRS configuration of the UE, or any combination thereof.

Figure 12:
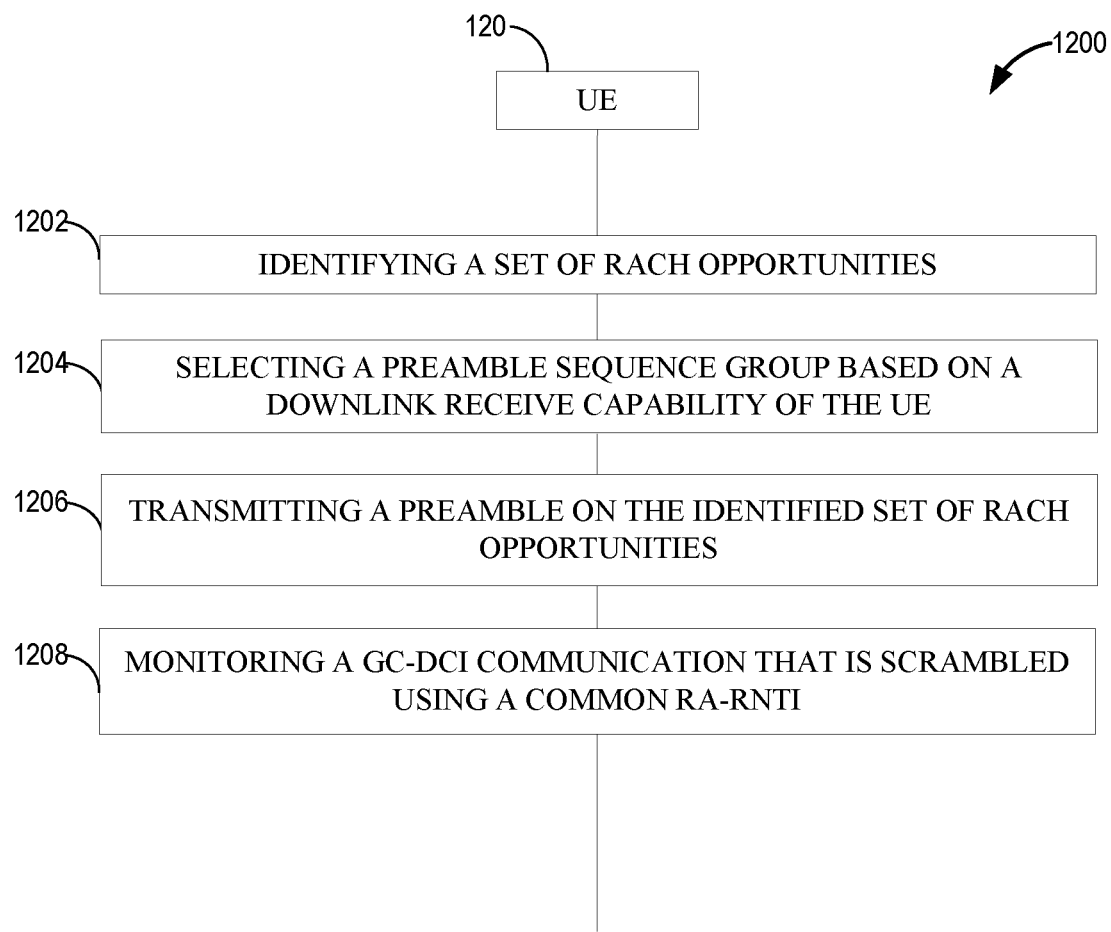
FIG. 12 illustrates an exemplary process of wireless communications according to an aspect of the disclosure.

FIG. 12 illustrates an exemplary process 1200 of wireless communications according to an aspect of the disclosure. The process 1200 of FIG. 12 is performed by UE 120. In an example, the UE performing the process 1200 of FIG. 12 may belong to the first UE class (e.g., an NR-Light UE or a UE that is equipped with a lower downlink receive capability, such as a UE with a number of receivers that is less than an antenna receiver threshold).

At 1202, UE 120 (e.g., controller/processor 240) identifies a set of ROs over which to transmit a preamble (e.g., a Msg-1 preamble for a 4-Step RACH procedure, or Msg-A preamble for a 2-Step RACH procedure) associated with a RACH procedure. In an example, the identification of 1202 may comprise a selection of a set of ROs among a plurality of sets of ROs based on one or more signal reception quality measurements. For example, the plurality of sets of ROs may comprise a first set of ROs dedicated to a first UE class (e.g., UEs with limited downlink receive capability such as NR-Light UEs) and a second set of ROs shared between the first UE class and a second UE class (e.g., UEs that do not have the downlink receive capability associated with the first UE class). In an example, the identification of 1202 may comprise a selection that is based on a relationship between the one or more signal reception quality measurements and at least one signal reception quality measurement threshold. For example, at 1202, the first set of ROs may be selected if the one or more signal reception quality measurements are less than the at least one signal reception quality measurement threshold, and the second set of ROs may be selected if the one or more signal reception quality measurements are not less than the at least one signal reception quality measurement threshold. In this case, in an example, lower-performing UEs of the first UE class may select the first set of ROs, while higher-performing UEs of the first UE class may select the second set of ROs. In some designs, the at least one signal reception quality measurement threshold is pre-defined (e.g., in the relevant 3GPP standard), while in other designs the at least one signal reception quality measurement threshold is configured dynamically (e.g., via a SIB such as SIB1 or via RRC signaling). In other designs, the set of ROs can be identified at 1202 in some other manner and need not be based upon the one or more signal reception quality measurements.

At 1204, UE 120 (e.g., controller/processor 280) selects a first preamble sequence group from among a plurality of preamble sequence groups associated with the identified first set of ROs based on a downlink receive capability of the UE, wherein the first preamble sequence group is associated with a first UE downlink receive capability level and a second preamble sequence group among the plurality of preamble sequence groups is associated with a second UE downlink receive capability level that is higher than the first UE downlink receive capability level. In some designs, the association between each of the plurality of preamble sequence groups and its respective downlink receive capability for the RAR is pre-defined (e.g., in the relevant 3GPP standard). In other designs, information indicative of the association between each of the plurality of preamble sequence groups and its respective downlink receive capability for the RAR is received from a base station (e.g., via RRC signaling or SIB).

At 1206, the UE 120 (e.g., antenna(s) 252a . . . 252r, TX MIMO processor 266, modulators(s) 254a . . . 254r, TX processor 264) transmits the preamble on the identified group of ROs. In an example, the preamble transmitted at 1206 may correspond to a Msg-A preamble of a 2-Step PRACH procedure, or alternatively to a Msg-1 preamble of a 4-Step PRACH procedure. In some designs, the preamble of 1206 may be configured to indicate to the UE's downlink receive capability to the base station (e.g., so that an appropriate number of RAR repetitions can be signaled to the UE).

At 1208, the UE 120 (e.g., 252a . . . 252r, demodulators(s) 254a . . . 254a, MIMO detector 256, RX processor 258) monitors a group common GC-DCI communication that is scrambled using a common RA-RNTI. In some designs, the GC-DCI communication is further monitored by at least one other UE associated with the same downlink receive capability as the UE which selected a second set of ROs based over which to transmit at least one respective preamble.

Figure 13:
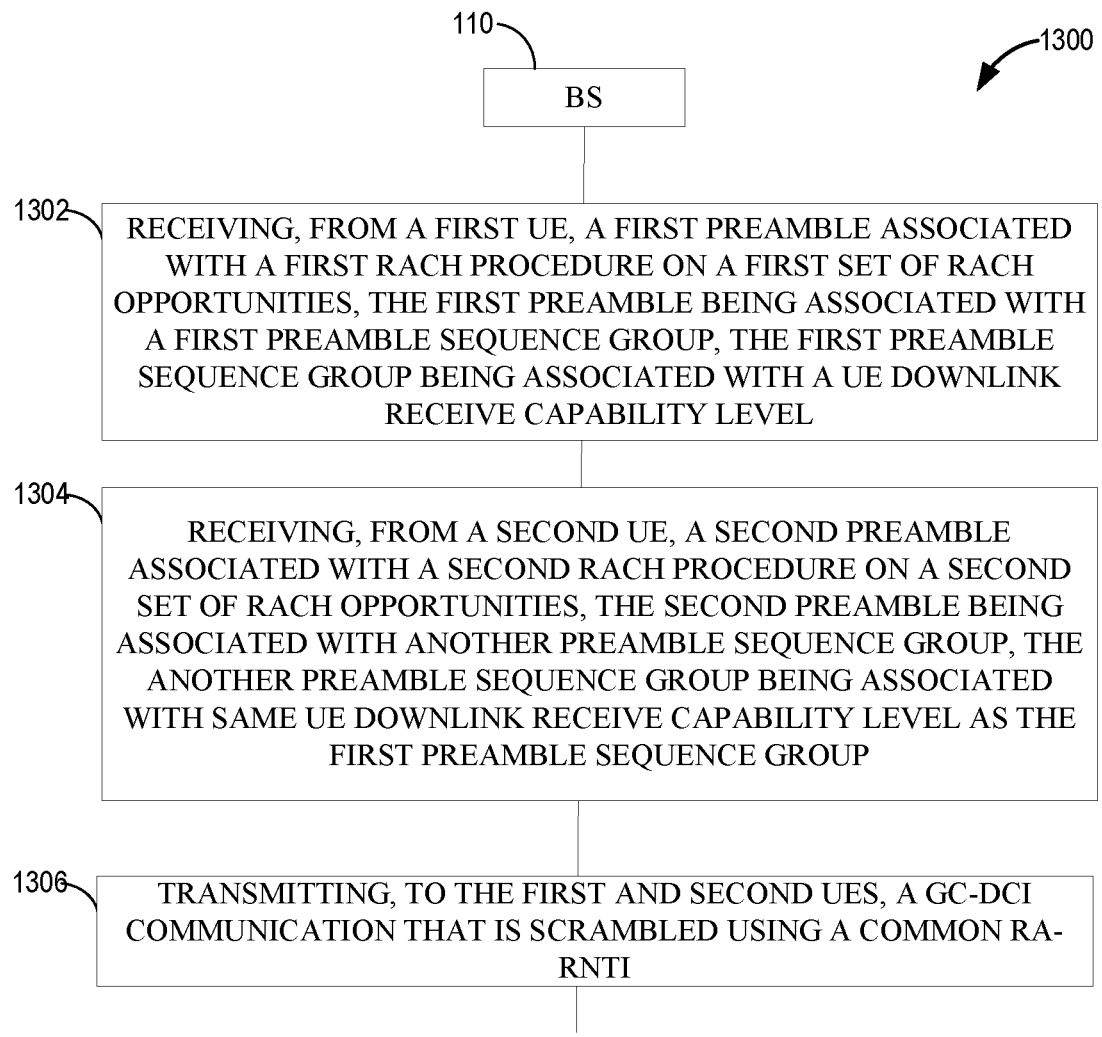
FIG. 13 illustrates an exemplary process of wireless communications according to an aspect of the disclosure.

FIG. 13 illustrates an exemplary process 1300 of wireless communications according to an aspect of the disclosure. The process 1300 of FIG. 11 is performed by BS 110.

At 1302, BS 110 (e.g., antenna(s) 234a . . . 234t, demodulators(s) 232a . . . 232a, MIMO detector 236, RX processor 238) receives, from a first UE, a first preamble associated with a RACH procedure over a first set of ROs among a plurality of sets of ROs, wherein the first set of ROs over which the first preamble is received is associated with a first preamble sequence group among a plurality of preamble sequence groups, wherein the first preamble sequence group is associated with a first UE downlink receive capability level and a second preamble sequence group among the first plurality of preamble sequence groups is associated with a second UE downlink receive capability level that is higher than the first UE downlink receive capability level. The first UE may belong to the first UE class (e.g., an NR-Light UE or a UE that is equipped with a lower downlink receive capability, such as a UE with a number of receivers that is less than an antenna receiver threshold). In an example, the preamble received at 1302 may correspond to a Msg-A preamble of a 2-Step PRACH procedure, or alternatively to a Msg-1 preamble of a 4-Step PRACH procedure. In some designs, the preamble of 1302 may be configured to indicate to the first UE's downlink receive capability to the base station (e.g., so that an appropriate number of RAR repetitions can be signaled to the first UE).

At 1304, BS 110 (e.g., antenna(s) 234a . . . 234t, demodulators(s) 232a . . . 232a, MIMO detector 236, RX processor 238) receives, from a second UE, a second preamble associated with a second RACH procedure over a second set of ROs among the plurality of sets of ROs, wherein the second set of ROs over which the second preamble is received is associated with a third preamble sequence group among a second plurality of preamble sequence groups, wherein the third preamble sequence group is associated with the first UE downlink receive capability level and a fourth preamble sequence group among the second plurality of preamble sequence groups is associated with the second UE downlink receive capability level. The second UE may belong to the first UE class (e.g., an NR-Light UE or a UE that is equipped with a lower downlink receive capability, such as a UE with a number of receivers that is less than an antenna receiver threshold). In an example, the preamble received at 1304 may correspond to a Msg-A preamble of a 2-Step PRACH procedure, or alternatively to a Msg-1 preamble of a 4-Step PRACH procedure. In some designs, the preamble of 1304 may be configured to indicate to the second UE's downlink receive capability to the base station (e.g., so that an appropriate number of RAR repetitions can be signaled to the second UE).

At 1306, BS 110 (e.g., antenna(s) 234a . . . 234t, modulators(s) 232a . . . 232a, TX MIMO processor 230, TX processor 220) transmits, to the first and second UEs in response to the first and second preambles, a GC-DCI communication that is scrambled using a common random RA-RNTI, wherein the GC-DCI communication includes information targeted to both the first and second UEs. In some designs, the GC-DCI indicates (i) a first set of time-domain resources for RAR to the first UE, and (ii) a second set of time-domain resources for RAR to the second UE.

Figure 14:
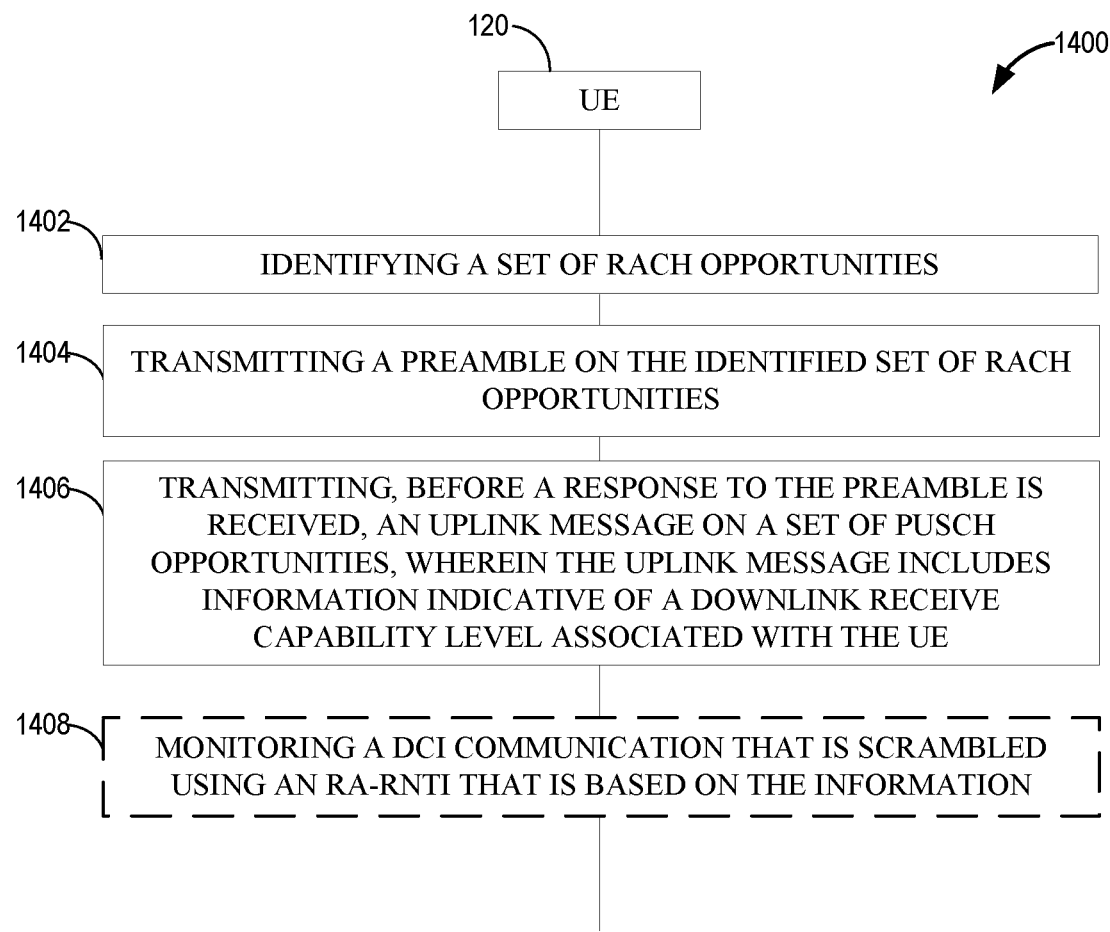
FIG. 14 illustrates an exemplary process of wireless communications according to an aspect of the disclosure.

FIG. 14 illustrates an exemplary process 1400 of wireless communications according to an aspect of the disclosure. The process 1400 of FIG. 14 is performed by UE 120. In an example, the UE performing the process 1400 of FIG. 14 may belong to the first UE class (e.g., UEs with limited downlink receive capability such as NR-Light UEs) or the second UE class (e.g., a UE that is equipped with a higher downlink receive capability, such as a premium UE with a number of receivers that is at least equal to the threshold). Unlike the processes of FIGS. 8-13 which may correspond to either 2-Step RACH procedures or 4-Step RACH procedures, the process 1400 of FIG. 14 relates specifically to a 2-Step RACH procedure.

At 1402, UE 120 (e.g., controller/processor 240) identifies a set of ROs over which to transmit a preamble (e.g., Msg-A preamble for a 2-Step RACH procedure) associated with a RACH procedure. In an example, the identification of 1402 may comprise a selection of a set of ROs among a plurality of sets of ROs based on one or more signal reception quality measurements. For example, the plurality of sets of ROs may comprise a first set of ROs dedicated to a first UE class (e.g., UEs with limited downlink receive capability such as NR-Light UEs) and a second set of ROs shared between the first UE class and a second UE class (e.g., UEs that do not have the downlink receive capability associated with the first UE class). In an example, the identification of 1402 may comprise a selection that is based on a relationship between the one or more signal reception quality measurements and at least one signal reception quality measurement threshold. For example, at 1402, the first set of ROs may be selected if the one or more signal reception quality measurements are less than the at least one signal reception quality measurement threshold, and the second set of ROs may be selected if the one or more signal reception quality measurements are not less than the at least one signal reception quality measurement threshold. In this case, in an example, lower-performing UEs of the first UE class may select the first set of ROs, while higher-performing UEs of the first UE class may select the second set of ROs. In some designs, the at least one signal reception quality measurement threshold is pre-defined (e.g., in the relevant 3GPP standard), while in other designs the at least one signal reception quality measurement threshold is configured dynamically (e.g., via a SIB such as SIB1 or via RRC signaling). In other designs, the set of ROs can be identified at 1402 in some other manner and need not be based upon the one or more signal reception quality measurements.

At 1404, the UE 120 (e.g., antenna(s) 252a . . . 252r, TX MIMO processor 266, modulators(s) 254a . . . 254r, TX processor 264) transmits the preamble on the identified group of ROs. In an example, the preamble transmitted at 1406 may correspond to a Msg-A preamble of a 2-Step PRACH procedure.

At 1406, the UE 120 (e.g., antenna(s) 252a . . . 252r, TX MIMO processor 266, modulators(s) 254a . . . 254r, TX processor 264) transmits, before a response to the preamble is received, an uplink message associated with the RACH procedure on a set of physical uplink shared channel (PUSCH) opportunities (POs) (e.g., where a number of POs corresponds to a repetition level for the uplink message). In an example, the uplink message transmitted at 1408 may correspond to a Msg-A payload of a 2-Step PRACH procedure. The uplink message includes information indicative of a first downlink receive capability level associated with the UE. For example, the information may indicate a number of receive antennas associated with the UE, or may indicate whether the UE belongs to the first UE class or the second UE class, etc.

At 1408, the UE 120 (e.g., 252a . . . 252r, demodulators(s) 254a . . . 254a, MIMO detector 256, RX processor 258) optionally monitors a DCI communication that is scrambled using a first RA-RNTI. For example, the first downlink receive capability level may be associated with the first RA-RNTI that is different than a second RA-RNTI associated with a second downlink receive capability level. In some designs, the DCI communication is a GC-DCI communication that includes information targeted to the UE and to one or more UEs that transmitted one or more respective preambles on a second set of ROs, the UE and the one or more UEs both being associated with the first downlink receive capability level.

Figure 15:
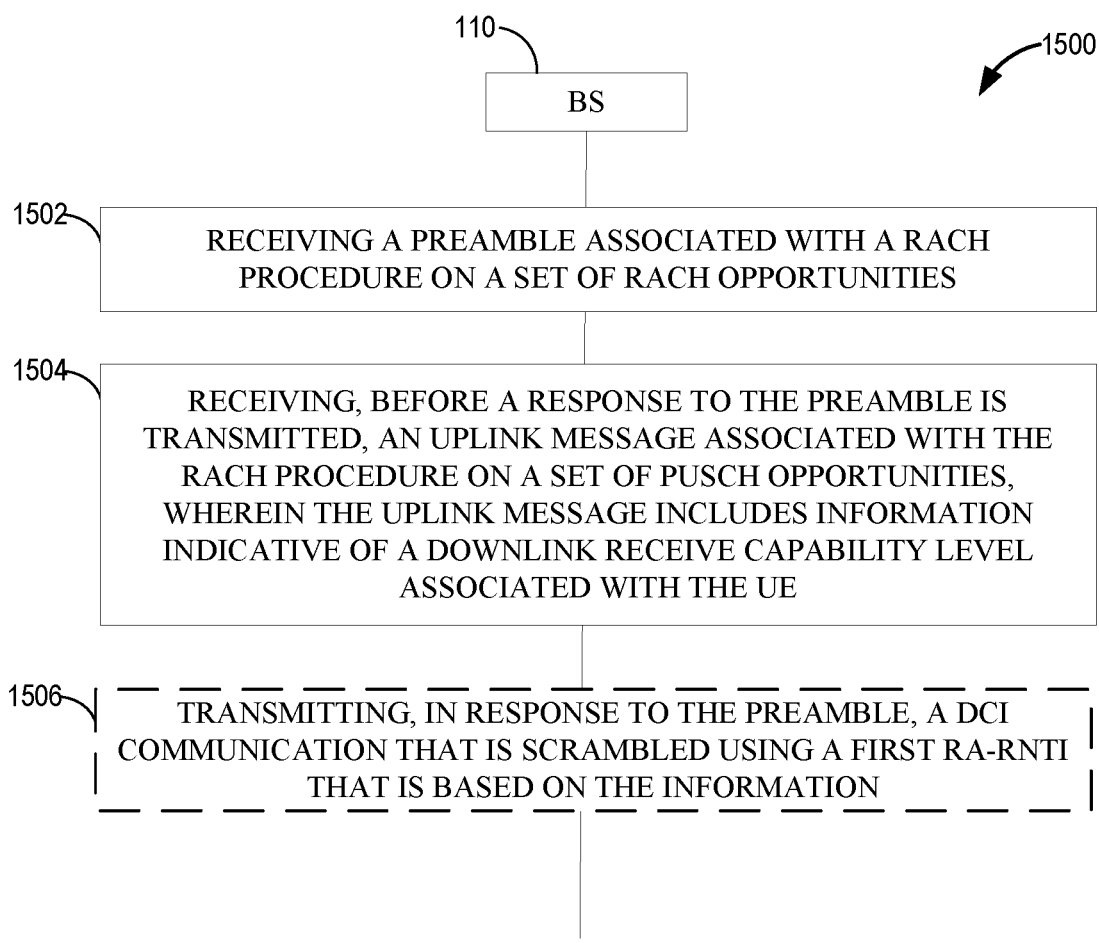
FIG. 15 illustrates an exemplary process of wireless communications according to an aspect of the disclosure.

FIG. 15 illustrates an exemplary process 1500 of wireless communications according to an aspect of the disclosure. The process 1500 of FIG. 15 is performed by BS 110. Unlike the processes of FIGS. 8-13 which may correspond to either 2-Step RACH procedures or 4-Step RACH procedures, the process 1500 of FIG. 15 relates specifically to a 2-Step RACH procedure.

At 1502, BS 110 (e.g., antenna(s) 234a . . . 234t, demodulators(s) 232a . . . 232a, MIMO detector 236, RX processor 238) receives, from a first UE, a first preamble associated with a first RACH procedure (e.g., a 2-Step RACH or PRACH procedure) over a first set of ROs among a plurality of sets of ROs. In an example, the first UE may belong to the first UE class (e.g., UEs with limited downlink receive capability such as NR-Light UEs) or the second UE class (e.g., a UE that is equipped with a higher downlink receive capability, such as a premium UE with a number of receivers that is at least equal to the threshold). In an example, the first preamble received at 1502 may correspond to the preamble transmitted at 1404 of FIG. 14.

At 1504, BS 110 (e.g., antenna(s) 234a . . . 234t, demodulators(s) 232a . . . 232a, MIMO detector 236, RX processor 238) receives, before a response to the preamble is transmitted, an uplink message associated with the RACH procedure on a set of POs. In an example, the uplink message transmitted at 1408 may correspond to a Msg-A payload of a 2-Step PRACH procedure. The uplink message includes information indicative of a first downlink receive capability level associated with the UE. For example, the information may indicate a number of receive antennas associated with the UE, or may indicate whether the UE belongs to the first UE class or the second UE class, etc. In an example, the first uplink received at 1504 may correspond to the preamble transmitted at 1406 of FIG. 14.

Figure 16:
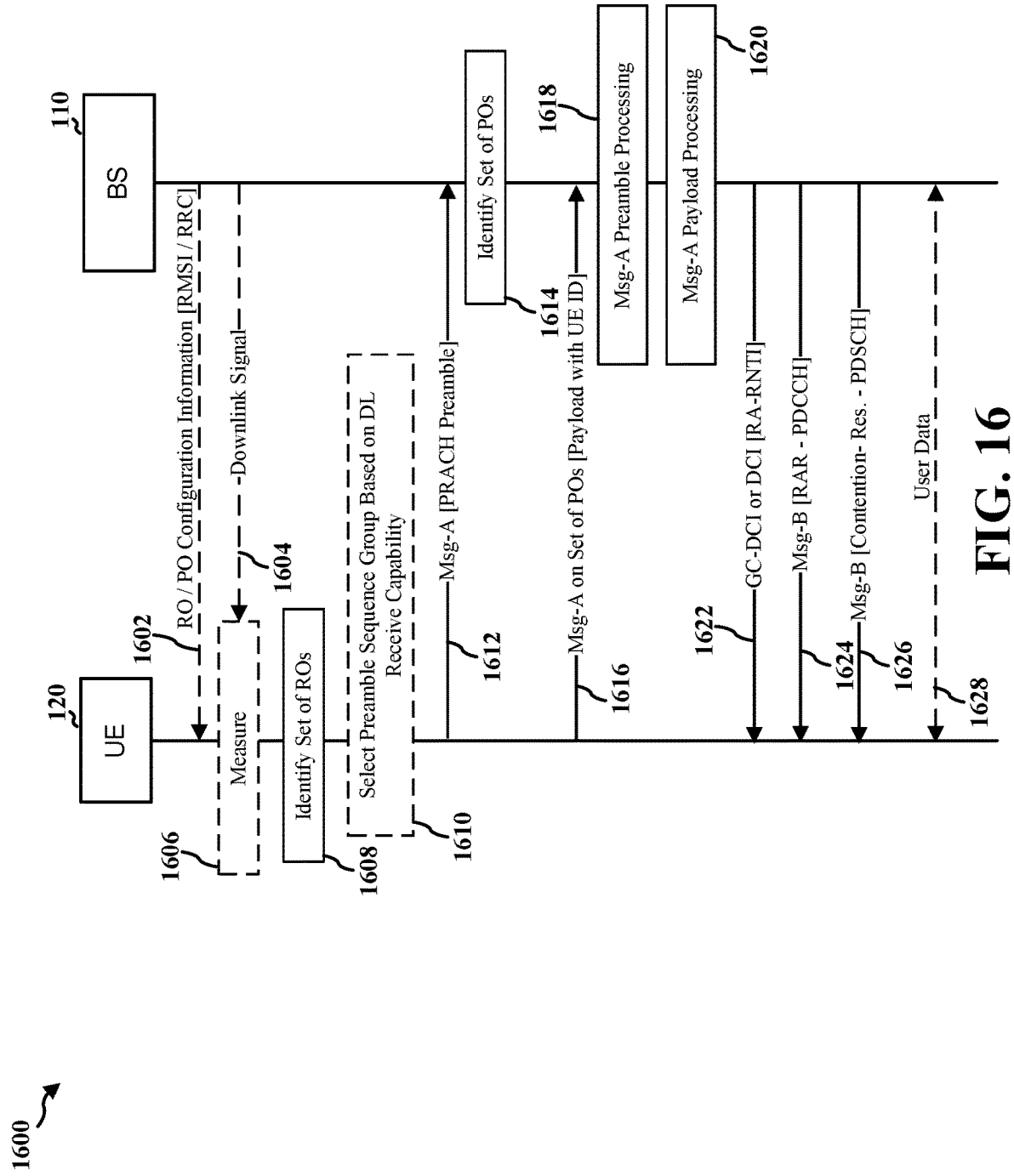
FIG. 16 illustrates an example implementation of one or more of the processes of FIGS. 8-15 in accordance with an embodiment of the disclosure.

At 1506, BS 110 (e.g., antenna(s) 234a . . . 234t, modulators(s) 232a . . . 232a, TX MIMO processor 230, TX processor 220) optionally transmits, in response to the preamble, a DCI communication that is scrambled using a first RA-RNTI that is based on the information. In some designs, the first RA-RNTI is different than a second RA-RNTI associated with a second downlink receive capability level. In some designs, the DCI communication may be a group common GC-DCI communication, and the GC-DCI communication is further monitored by at least one other UE which selected a second set of ROs based over which to transmit at least one respective preamble, the first and second UEs both being associated with the first downlink receive capability level FIG. 16 illustrates an example implementation 1600 of one or more of the processes 800-1500 of FIGS. 8-15 in accordance with an embodiment of the disclosure. The process 1600 constitutes a modified version of the 2-Step PRACH procedure 400 of FIG. 4 or 500 of FIG. 5.

At 1602, BS 110 optionally transmits RO configuration information and/or PO configuration information to UE 120 (e.g., via RMSI signaling, RRC signaling, or SIB1). At 1604, BS 110 optionally transmits a downlink signal (e.g., PSS/SSS), and at 1606 UE 120 optionally receives and measures the downlink signal. At 1608, UE 120 identifies a set of ROs (e.g., via selection based on the downlink signal measurement(s) from 1606). At 1610, UE 120 optionally selects a preamble sequence group to be used on the identified RO group based on a downlink receive capability of the UE (e.g., in association with a set of POs corresponding to a repetition level preference for an uplink message, such as Msg-A payload). In an example, the preamble sequence group selection at 1610 is optional at least because, in FIGS. 14-15, the downlink receive capability level may be indicated via information in the Msg-A payload instead of via the preamble sequence group selection associated with the Msg-A preamble.

At 1612, UE 120 transmits Msg-A preamble (or PRACH preamble) to BS 110. At 1614, BS 110 identifies a set of POs (e.g., corresponding to Msg-A payload repetition level) from the Msg-A preamble of 1612 (e.g., based on which preamble sequence group was used, etc.). At 1616, UE 120 transmits Msg-A payload (e.g., one or more PUSCH repetitions, which may optionally include information indicating the downlink receive capability level of the UE as in FIGS. 14-15) to BS 110 (e.g., in accordance with the repetition level indicated by Msg-A preamble). At 1618, BS 110 processes the Msg-A PRACH preamble from 1612. At 1620, BS 110 processes the Msg-A payload from 1616. At 1622, BS 110 transmits a DCI (e.g., a GC-DCI) to UE 120 that is scrambled with an RA-RNTI (e.g., which is specific to the preamble sequence group and/or downlink receive capability level of the UE). At 1624, BS 110 transmits a Msg-B RAR via PDCCH (e.g., at a repetition level that is based on the downlink receive capability level of the UE). At 1626, BS 110 transmits Msg-B contention resolution information via PDCCH. At 1628, UE 120 and BS 110 may optionally exchange user data.

Figure 17:
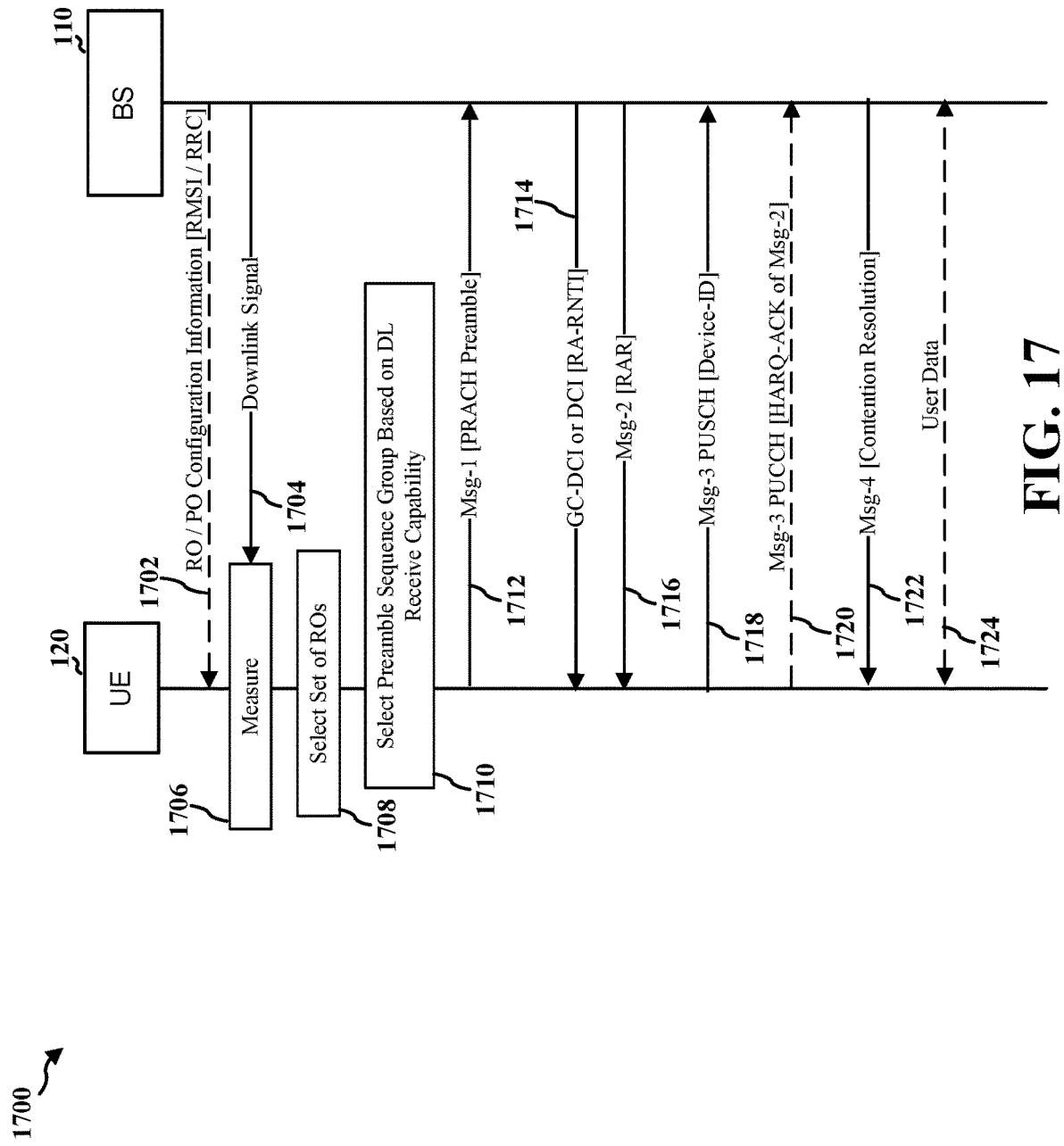
FIG. 17 illustrates an example implementation of one or more of the processes of FIGS. 8-15 in accordance with an embodiment of the disclosure.

FIG. 17 illustrates an example implementation 1700 of one or more of the processes 800-1300 of FIGS. 8-13 in accordance with an embodiment of the disclosure. The process 1700 constitutes a modified version of the 4-Step PRACH procedure 300 of FIG. 3.

At 1702, BS 110 optionally transmits RO configuration information and/or PO configuration information to UE 120 (e.g., via RMSI signaling, RRC signaling, or SIB1). At 1704, BS 110 optionally transmits a downlink signal (e.g., PSS/SSS), and at 1706 UE 120 optionally receives and measures the downlink signal. At 1708, UE 120 identifies a set of ROs (e.g., via selection based on the downlink signal measurement(s) from 1706). At 1710, UE 120 selects a preamble sequence group to be used on the identified RO group based on a downlink receive capability of the UE (e.g., in association with a set of POs corresponding to a repetition level preference for an uplink message, such as Msg-3 PUSCH and/or Msg-3 PUCCH).

At 1712, UE 120 transmits Msg-1 preamble (or PRACH preamble) to BS 110. At 1714, BS 110 transmits a DCI (e.g., a GC-DCI) to UE 120 that is scrambled with an RA-RNTI (e.g., which is specific to the preamble sequence group and/or downlink receive capability level of the UE). At 1716, BS 110 transmits Msg-2 RAR (e.g., one or more RAR repetitions, based on the downlink receive capability level associated with the selected preamble sequence group) to UE 120. At 1718, UE 120 transmits one or more Msg-3 PUSCH(es) to BS 110 (e.g., on a respective set of POs that corresponds to the Msg-3 repetition level). At 1720, UE 120 optionally transmits one or more Msg-3 PUCCH(es) to BS 110 (e.g., on a respective set of POs that corresponds to the Msg-3 repetition level). At 1722, BS 110 transmits Msg-4 contention resolution to UE 120. At 1724, UE 120 and BS 110 may optionally exchange user data.

Figure 18:
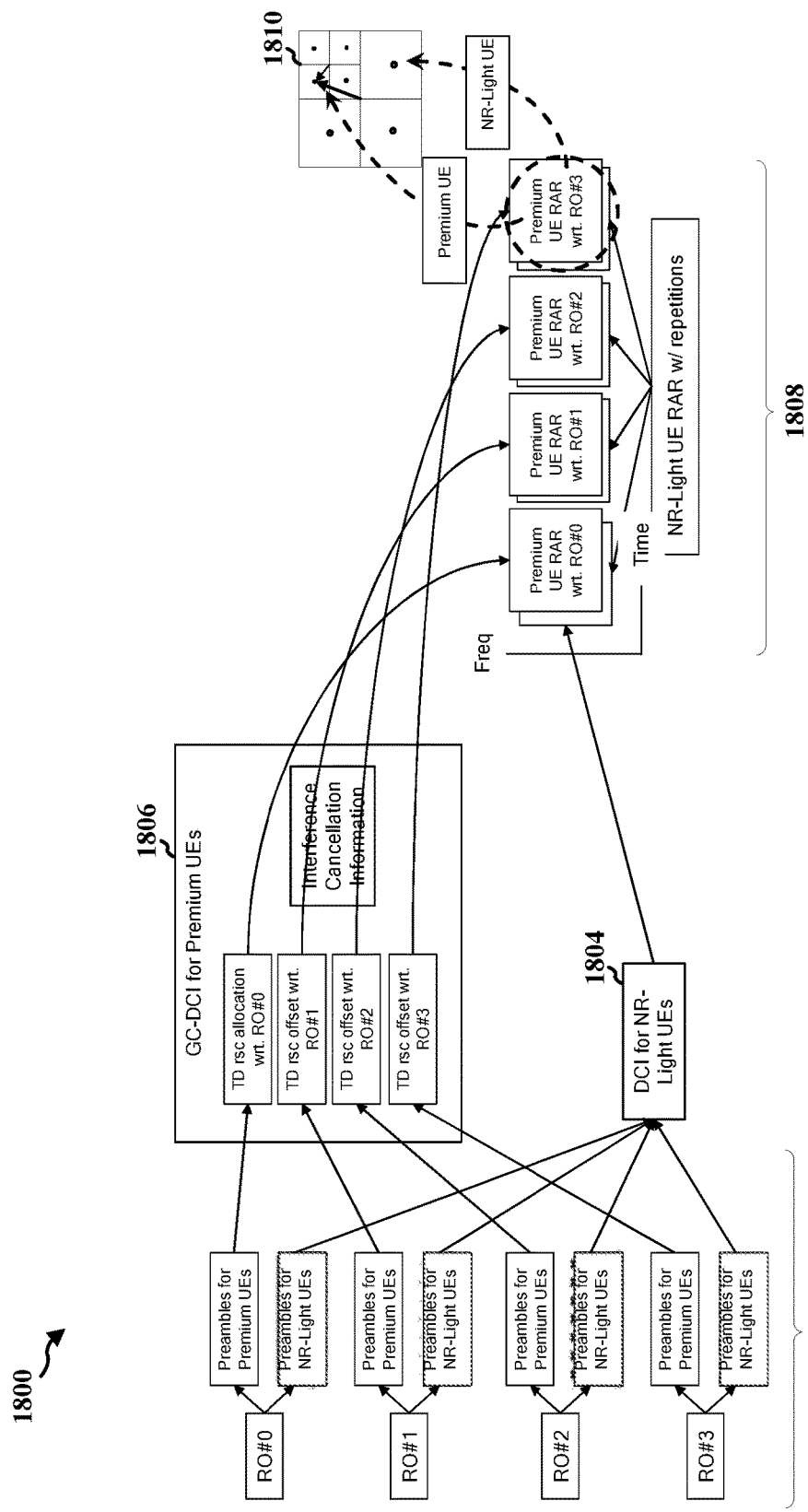
FIG. 18 illustrates an alternative visualization of one or more of the processes of FIGS. 8-15 in accordance with an embodiment of the disclosure.

FIG. 18 illustrates an alternative visualization 1800 of one or more of the processes 800-1500 of FIGS. 8-15 in accordance with an embodiment of the disclosure. At 1802, ROs #0 through #4 are each associated with two preamble sequence groups (one for premium UEs, and one for NR-Light UEs). In some designs, it will be appreciated that high-performing NR-Light UEs (e.g., NR-Light UEs very close to a serving base station with high channel gain, etc.) may use the preamble sequence group for the premium UEs. The NR-Light UEs that transmit preambles using the NR-Light preamble sequence groups for any of ROs #1 through #4 monitor a DCI 1804 for the NR-Light UEs (e.g., scrambled with a first RA-RNTI). The premium UEs that transmit preambles using the premium UE preamble sequence groups on any of ROs #1 through #4 monitor a GC-DCI 1806 for the premium UEs (e.g., scrambled with a second RA-RNTI). The GC-DCI 1806 may comprise interference cancellation information, so that premium UEs operating as virtual near-UEs for MUST-based transmissions may cancel out signaling directed to NR-Light UEs operating as corresponding virtual far-UEs. The RAR transmissions are shown at 1808, whereby the RAR transmissions to the NR-Light UEs comprise repetitions (e.g., 2, 4, etc.) while the RAR transmissions to the premium UEs do not comprise repetitions. In an example, premium UEs associated with different ROs are indicated in the GC-DCI 1806 with different TD resources, wherein the resource allocation for premium UEs associated with different ROs is based on the RO orders. In an example, data that is unrelated to the RACH procedure may be sent to premium UEs on time-domain resources used to transmit RAR repetitions to the NR-Light UEs (e.g., configurable via the GC-DCI 1806). One particular MUST-based transmission 1810 to a premium UE (virtual near-UE) and an NR-Light UE (virtual far-UE) is depicted in a symbol domain.

Referring to FIG. 18, premium UEs associated with different ROs (e.g., RO #0, RO #1, etc.) are indicated in the GC-DCI 1806 with respect to different time-domain resource allocations for the RAR transmissions at 1808 based on the respective ROs. NR-Light UEs associated with these same ROs may be allocated time-domain resources for the RAR transmissions at 1808 with repetitions as indicated via the DCI 1804. Hence, the time-domain resources used for the RAR transmissions at 1808 by the premium UEs and the NR-Light UEs may overlap at least in part (e.g., MUST-based RAR transmissions), which may improve resource efficiency with a carefully chosen power ratio by gNB implementation.

Figure 19:
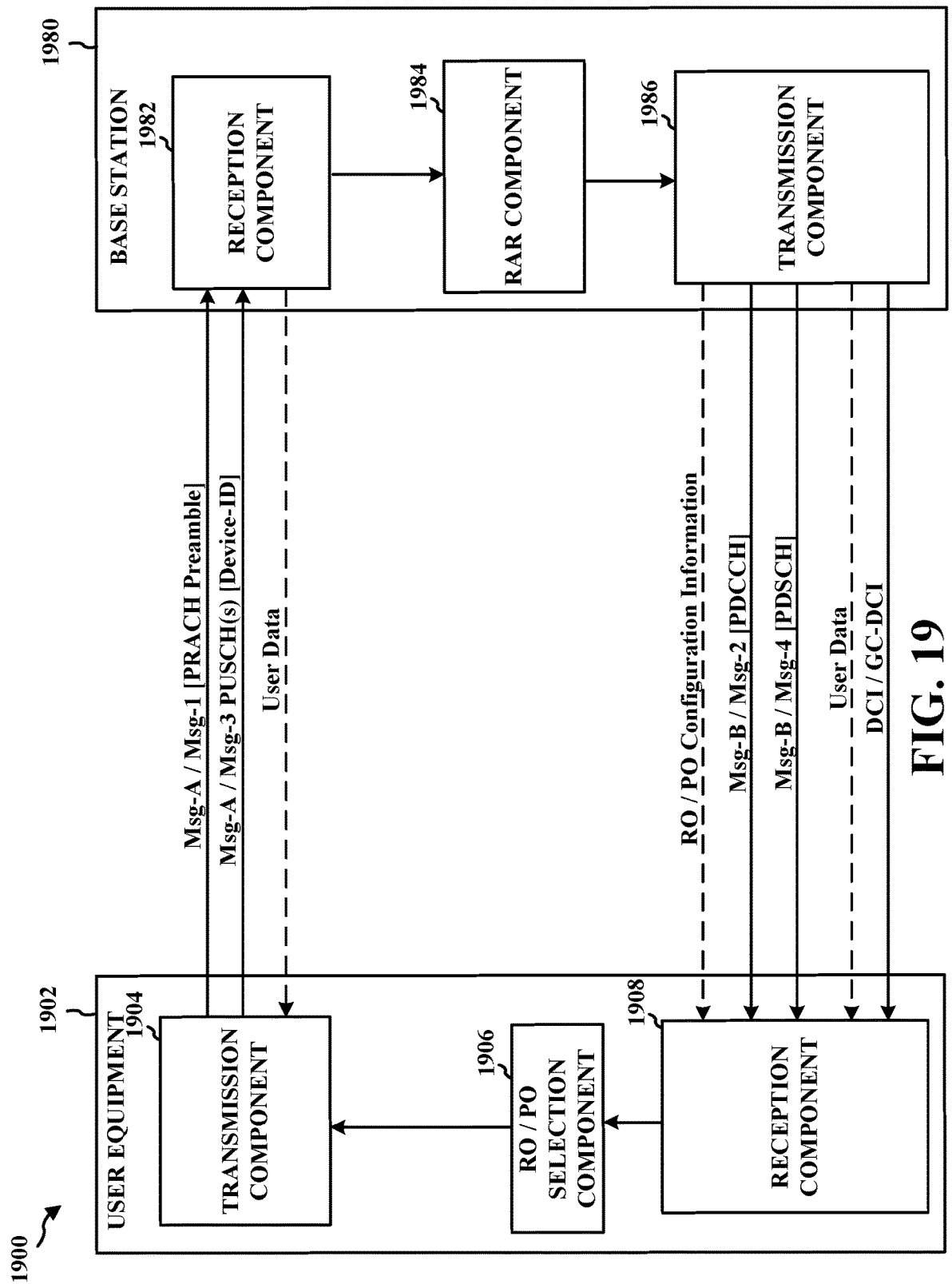
FIG. 19 is a conceptual data flow diagram illustrating the data flow between different means/components in exemplary apparatuses in accordance with an embodiment of the disclosure.

FIG. 19 is a conceptual data flow diagram 1900 illustrating the data flow between different means/components in exemplary apparatuses 1902 and 1980 in accordance with an embodiment of the disclosure. The apparatus 1902 may be a UE (e.g., UE 120) in communication with an apparatus 1980, which may be a base station (e.g., base station 110).

The apparatus 1902 includes a transmission component 1904, which may correspond to transmitter circuitry in UE 120 as depicted in FIG. 2, including controller/processor 280, antenna(s) 252a ... 252r, modulators(s) 254a ... 254r, TX MIMO processor 266, TX processor 264. The apparatus 1902 further includes an RO/PO selection component 1906, which may correspond to processor circuitry in UE 120 as depicted in FIG. 2, including controller/processor 280, etc. The apparatus 1902 further includes a reception component 1908, which may correspond to receiver circuitry in UE 120 as depicted in FIG. 2, including controller/processor 280, antenna(s) 252a ... 252r, demodulators(s) 254a ... 254r, MIMO detector 256, RX processor 258.

The apparatus 1980 includes a reception component 1982, which may correspond to receiver circuitry in BS 110 as depicted in FIG. 2, including controller/processor 240, antenna(s) 234a ... 234r, demodulators(s) 232a ... 232r, MIMO detector 236, RX processor 238, communication unit 244. The apparatus 1980 further optionally includes a RAR component 1984, which may correspond to processor circuitry in BS 110 as depicted in FIG. 2, including controller/processor 240. The apparatus 1980 further includes a transmission component 1986, which may correspond to transmission circuitry in BS 110 as depicted in FIG. 2, including e.g., controller/processor 240, antenna(s) 234a ... 234r, modulators(s) 232a ... 232r, Tx MIMO processor 230, TX processor 220, communication unit 244.

Referring to FIG. 19, the transmission component 1986 optionally sends RO/PO configuration information to the reception component 1908, which may be factored into RO/PO selections by the RO/PO selection component 1906. The transmission component 1904 may transmit Msg-1 and/or Msg-A PRACH preambles and Msg-3 and/or Msg-A payloads (e.g., PUSCH(s) comprising UE identifying information) to the reception component 1982 (e.g., based on RO/PO selections from the RO/PO selection component 1906). The RAR component 1984 may determine a repetition level for the RAR (e.g., Msg-2 or Msg-B PDCCH) based on a preamble sequence group associated with the Msg-1 or Msg-A PRACH preamble, or alternatively based upon information in the Msg-A payload. The transmission component 1986 may transmit Msg-2 or Msg-B (PDCCH) and Msg-4 or Msg-B (PDSCH) in response to the Msg-1, Msg-3, or Msg-A transmissions. After the 2-Step or 4-Step PRACH procedure, the transmission component 1904 and the reception component 1982 may exchange user data, and the transmission component 1986 and the reception component 1908 may likewise exchange user data.

One or more components of the apparatus 1902 and apparatus 1980 may perform each of the blocks of the algorithm in the aforementioned flowcharts of FIGS. 8-17. As such, each block in the aforementioned flowcharts of FIGS. 8-17 may be performed by a component and the apparatus 1902 and apparatus 1980 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 20:
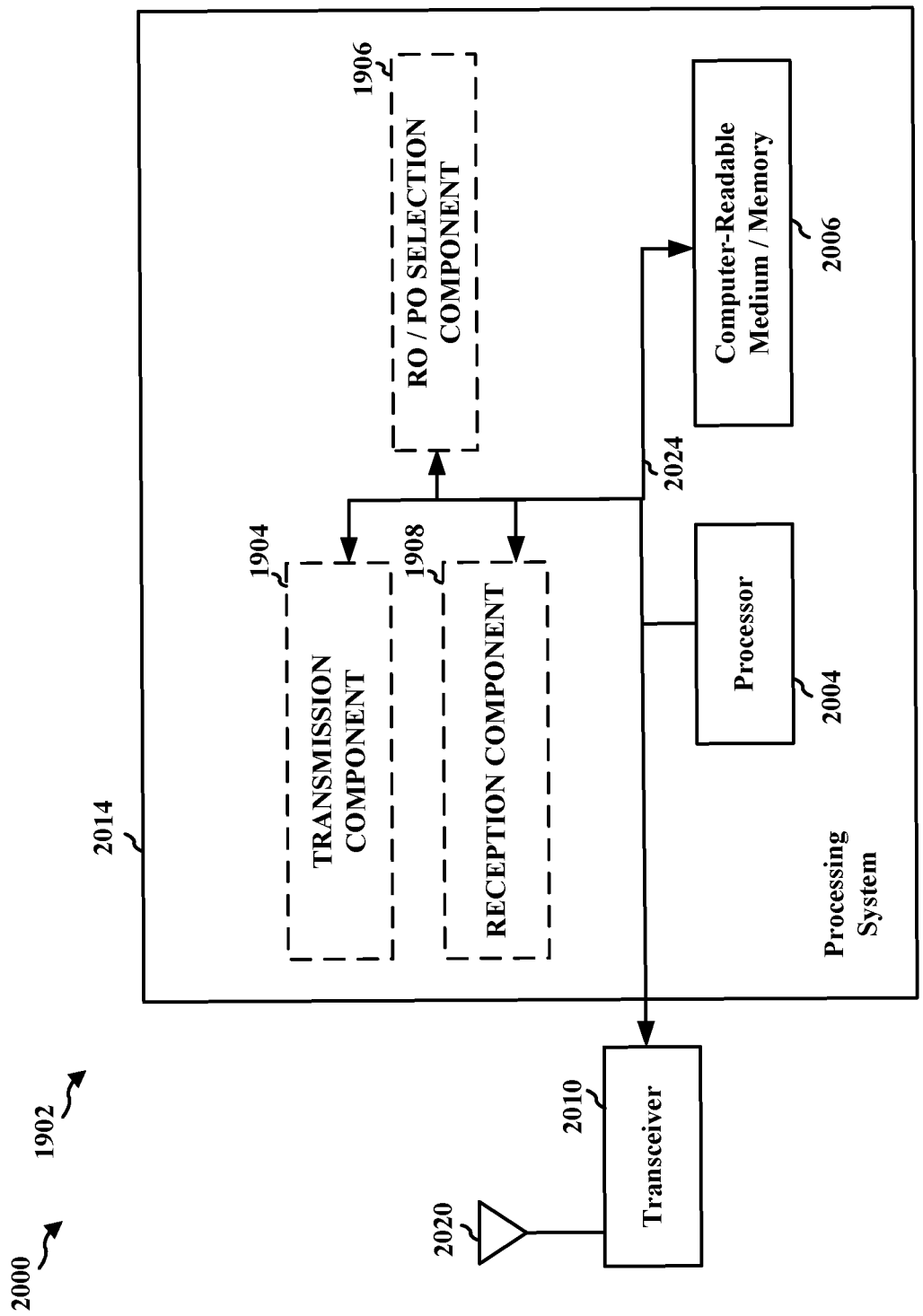
FIG. 20 is a diagram illustrating an example of a hardware implementation for an apparatus employing a processing system.

FIG. 20 is a diagram 2000 illustrating an example of a hardware implementation for an apparatus 1902 employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware components, represented by the processor 2004, the components 1904, 1906 and 1908, and the computer-readable medium/memory 2006. The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The transceiver 2010 receives a signal from the one or more antennas 2020, extracts information from the received signal, and provides the extracted information to the processing system 2014, specifically the reception component 1908. In addition, the transceiver 2010 receives information from the processing system 2014, specifically the transmission component 1904, and based on the received information, generates a signal to be applied to the one or more antennas 2020. The processing system 2014 includes a processor 2004 coupled to a computer-readable medium/memory 2006. The processor 2004 is responsible for general processing, including the execution of software stored on the computer-readable medium/memory 2006. The software, when executed by the processor 2004, causes the processing system 2014 to perform the various functions described supra for any particular apparatus. The computer-readable medium/memory 2006 may also be used for storing data that is manipulated by the processor 2004 when executing software. The processing system 2014 further includes at least one of the components 1904, 1906 and 1908. The components may be software components running in the processor 2004, resident/stored in the computer readable medium/memory 2006, one or more hardware components coupled to the processor 2004, or some combination thereof. The processing system 2014 may be a component of the UE 120 of FIG. 2 and may include the memory 282, and/or at least one of the TX processor 264, the RX processor 258, and the controller/processor 280.

In one configuration, the apparatus 1902 (e.g., a UE) for wireless communication includes means for identifying a first set of ROs over which to transmit a preamble associated with a RACH procedure, means for selecting a first preamble sequence group from among a plurality of preamble sequence groups associated with the identified first set of ROs based on a downlink receive capability of the UE, wherein the first preamble sequence group is associated with a first UE downlink receive capability level and a second preamble sequence group among the plurality of preamble sequence groups is associated with a second UE downlink receive capability level that is different than the first UE downlink receive capability level, means for transmitting the preamble on the identified set of ROs, and means for receiving, in response to the transmitted preamble, a RAR.

In another configuration, the apparatus 1902 (e.g., a UE) for wireless communication includes means for identifying a first set of ROs over which to transmit a preamble associated with a RACH procedure, means for selecting a first preamble sequence group from among a plurality of preamble sequence groups associated with the identified first set of ROs based on a downlink receive capability of the UE, wherein the first preamble sequence group is associated with a first UE downlink receive capability level and a second preamble sequence group among the plurality of preamble sequence groups is associated with a second UE downlink receive capability level that is lower than the first UE downlink receive capability level, wherein the first preamble sequence group is associated with a first random access radio network temporary identifier (RA-RNTI) and the second preamble sequence group is associated with a second RA-RNTI that is different than the first RA-RNTI, means for transmitting the preamble on the identified set of ROs, and means for monitoring a downlink control information (DCI) communication that is scrambled using the first RA-RNTI.

In another configuration, the apparatus 1902 (e.g., a UE) for wireless communication includes means for identifying a first set of ROs over which to transmit a preamble associated with a RACH procedure, means for selecting a first preamble sequence group from among a plurality of preamble sequence groups associated with the identified first set of ROs based on a downlink receive capability of the UE, wherein the first preamble sequence group is associated with a first UE downlink receive capability level and a second preamble sequence group among the plurality of preamble sequence groups is associated with a second UE downlink receive capability level that is higher than the first UE downlink receive capability level, means for transmitting the preamble on the identified set of ROs, and means for monitoring a GC-DCI communication that is scrambled using a common random access RA-RNTI.

In another configuration, the apparatus 1902 (e.g., a UE) for wireless communication includes means for identifying a set of ROs over which to transmit a preamble associated with a RACH procedure, means for transmitting the preamble on the identified set of ROs, and means for transmitting, before a response to the preamble is received, an uplink message associated with the RACH procedure on a set of POs, wherein the uplink message includes information indicative of a first downlink receive capability level associated with the UE.

The aforementioned means may be one or more of the aforementioned components of the apparatus 1902 and/or the processing system 2014 of the apparatus 1902 configured to perform the functions recited by the aforementioned means. As described supra, the processing system 2014 may include the TX processor 264, the RX processor 258, and the controller/processor 280.

Figure 21:
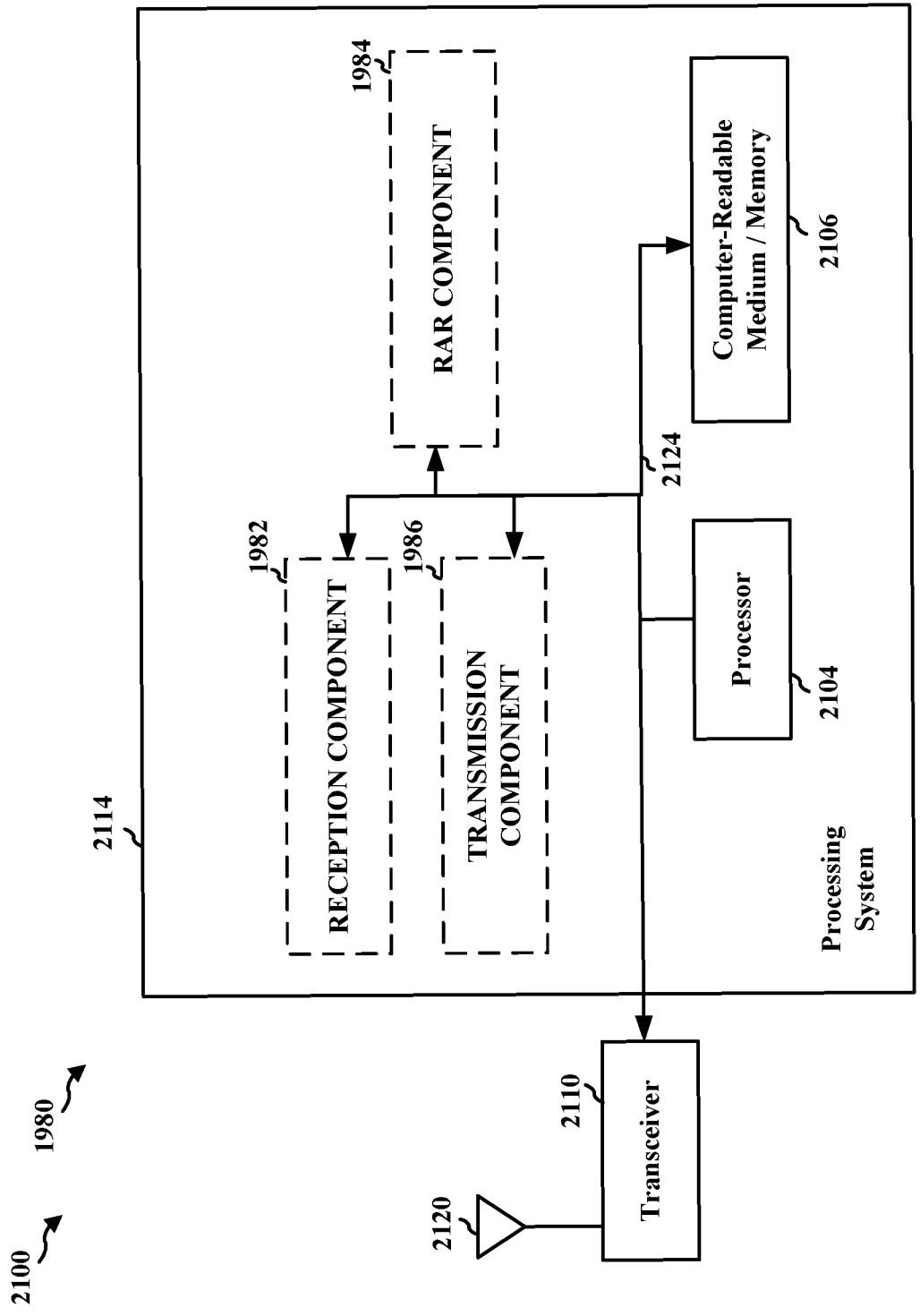
FIG. 21 is a diagram illustrating another example of a hardware implementation for an apparatus employing a processing system.

FIG. 21 is a diagram 2100 illustrating an example of a hardware implementation for an apparatus 1980 employing a processing system 2114. The processing system 2114 may be implemented with a bus architecture, represented generally by the bus 2124. The bus 2124 may include any number of interconnecting buses and bridges depending on the specific application of the processing system 2114 and the overall design constraints. The bus 2124 links together various circuits including one or more processors and/or hardware components, represented by the processor 2104, the components 1982, 1984 and 1986, and the computer-readable medium/memory 2106. The bus 2124 may also link various other circuits such as timing sources, peripherals, voltage regulators, and power management circuits, which are well known in the art, and therefore, will not be described any further.

The processing system 2114 may be coupled to a transceiver 2110. The transceiver 2110 is coupled to one or more antennas 2120. The transceiver 2110 provides a means for communicating with various other apparatus over a transmission medium. The transceiver 2110 receives a signal from the one or more antennas 2120, extracts information from the received signal, and provides the extracted information to the processing system 2114, specifically the reception component 1982. In addition, the transceiver 2110 receives information from the processing system 2114, specifically the transmission component 1986, and based on the received information, generates a signal to be applied to the one or more antennas 2120. The processing system 2114 includes a processor 2104 coupled to a computer-readable medium/memory 2106. The processor 2104 is responsible for general processing, including the execution of software stored on the computer-readable medium/memory 2106. The software, when executed by the processor 2104, causes the processing system 2114 to perform the various functions described supra for any particular apparatus. The computer-readable medium/memory 2106 may also be used for storing data that is manipulated by the processor 2104 when executing software. The processing system 2114 further includes at least one of the components 1982, 1984 and 1986. The components may be software components running in the processor 2104, resident/stored in the computer readable medium/memory 2106, one or more hardware components coupled to the processor 2104, or some combination thereof. The processing system 2114 may be a component of the BS 110 of FIG. 2 and may include the memory 242, and/or at least one of the TX processor 220, the RX processor 238, and the controller/processor 240.

In one configuration, the apparatus 1980 (e.g., a BS) for wireless communication includes means for receiving, from a UE, a preamble associated with a RACH procedure over one of a plurality of sets of ROs, wherein the set of ROs over which the preamble is received is associated with a first preamble sequence group among a plurality of preamble sequence groups, wherein the first preamble sequence group is associated with a first UE downlink receive capability level and a second preamble sequence group among the plurality of preamble sequence groups is associated with a second UE downlink receive capability level that is different than the first UE downlink receive capability level, and means for transmitting, in response to the preamble, a RAR.

In another configuration, the apparatus 1980 (e.g., a BS) for wireless communication includes means for receiving, from a UE, a preamble associated with a RACH procedure over one of a plurality of sets of ROs, wherein the set of ROs over which the preamble is received is associated with a first preamble sequence group among a plurality of preamble sequence groups, wherein the first preamble sequence group is associated with a first UE downlink receive capability level and a second preamble sequence group among the plurality of preamble sequence groups is associated with a second UE downlink receive capability level that is lower than the first UE downlink receive capability level, wherein the first preamble sequence group is associated with a first RA-RNTI and the second preamble sequence group is associated with a second RA-RNTI that is different than the first RA-RNTI, and means for transmitting, in response to the preamble, a DCI communication that is scrambled using the first RA-RNTI.

In another configuration, the apparatus 1980 (e.g., a BS) for wireless communication includes means for receiving, from a first UE, a first preamble associated with a first RACH procedure over a first set of ROs among a plurality of sets of ROs, wherein the first set of ROs over which the first preamble is received is associated with a first preamble sequence group among a plurality of preamble sequence groups, wherein the first preamble sequence group is associated with a first UE downlink receive capability level and a second preamble sequence group among the first plurality of preamble sequence groups is associated with a second UE downlink receive capability level that is higher than the first UE downlink receive capability level, receiving, from a second UE, a second preamble associated with a second RACH procedure over a second set of ROs among the plurality of sets of ROs, wherein the second set of ROs over which the second preamble is received is associated with a third preamble sequence group among a second plurality of preamble sequence groups, wherein the third preamble sequence group is associated with the first UE downlink receive capability level and a fourth preamble sequence group among the second plurality of preamble sequence groups is associated with the second UE downlink receive capability level, and transmitting, to the first and second UEs in response to the first and second preambles, a GC-DCI communication that is scrambled using a common random access RA-RNTI, wherein the GC-DCI communication includes information targeted to both the first and second UEs.

In another configuration, the apparatus 1980 (e.g., a BS) for wireless communication includes means for receiving, from a first UE, a first preamble associated with a first RACH procedure over a first set of ROs among a plurality of sets of ROs, and means for receiving, before a response to the preamble is transmitted, an uplink message associated with the RACH procedure on a set of POs, wherein the uplink message includes information indicative of a first downlink receive capability level associated with the UE.

The aforementioned means may be one or more of the aforementioned components of the apparatus 1980 and/or the processing system 1114 of the apparatus 1980 configured to perform the functions recited by the aforementioned means. As described supra, the processing system 2114 may include the TX processor 220, the RX processor 238, and the controller/processor 240.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of operating a user equipment (UE), comprising:
   identifying a first set of random access channel (RACH) opportunities (ROs) over which to transmit a preamble associated with a RACH procedure;
   selecting a first preamble sequence group from among a plurality of preamble sequence groups associated with the identified first set of ROs based on a downlink receive capability of the UE, wherein the first preamble sequence group is associated with a first UE downlink receive capability level and a second preamble sequence group among the plurality of preamble sequence groups is associated with a second UE downlink receive capability level that is different than the first UE downlink receive capability level;
   transmitting the preamble on the identified set of ROs; and
   receiving, in response to the transmitted preamble, a random access response (RAR).

2. The method of claim 1, wherein the first preamble sequence group is associated with a first random access radio network temporary identifier (RA-RNTI) and the second preamble sequence group is associated with a second RA-RNTI that is different than the first RA-RNTI.

3. The method of claim 2, wherein the RAR is scrambled using the first RA-RNTI.

4. The method of claim 2,
   wherein a second set of ROs is associated with a second plurality of preamble sequence groups,
   wherein each of the second plurality of preamble sequence groups is associated with a different RA-RNTI, and
   wherein the RA-RNTIs associated with the plurality of preamble sequence groups is the same or different from the RA-RNTIs associated with the second plurality of preamble sequence groups.

5. The method of claim 1,
   wherein the first preamble sequence group is associated with UEs that include a number of receive antennas that is below a receive antenna threshold, and
   wherein the second preamble sequence group is associated with UEs that include a number of receive antennas that is not below the receive antenna threshold.

6. The method of claim 5, wherein the first preamble sequence group is associated with a legacy random access radio network temporary identifier (RA-RNTI) that is compatible with UEs associated with either the first UE downlink receive capability level or the second UE downlink receive capability level.

7. The method of claim 1,
   wherein the first preamble sequence group is associated with UEs that include a number of receive antennas that is not below a receive antenna threshold, and
   wherein the preamble sequence group class is associated with UEs that include a number of receive antennas that is below the receive antenna threshold.

8. The method of claim 7, wherein the first preamble sequence group is associated with a new random access radio network temporary identifier (RA-RNTI) that is compatible with UEs associated with the first UE downlink receive capability level and is incompatible with UEs associated with the second UE downlink receive capability level.

9. A method of operating a user equipment (UE), comprising:
   identifying a first set of random access channel (RACH) opportunities (ROs) over which to transmit a preamble associated with a RACH procedure;
   selecting a first preamble sequence group from among a plurality of preamble sequence groups associated with the identified first set of ROs based on a downlink receive capability of the UE, wherein the first preamble sequence group is associated with a first UE downlink receive capability level and a second preamble sequence group among the plurality of preamble sequence groups is associated with a second UE downlink receive capability level that is lower than the first UE downlink receive capability level, wherein the first preamble sequence group is associated with a first random access radio network temporary identifier (RA-RNTI) and the second preamble sequence group is associated with a second RA-RNTI that is different than the first RA-RNTI;

transmitting the preamble on the identified set of ROs; and monitoring a downlink control information (DCI) communication that is scrambled using the first RA-RNTI.

10. The method of claim 9, wherein the DCI is a group common (GC)-DCI that is associated with the first set of ROs and a second set of ROs, and wherein the GC-DCI indicates (i) a first set of time-domain resources for random access response (RAR) to one or more UEs that transmitted one or more respective preambles on the first set of ROs, and (ii) a second set of time-domain resources for RAR to one or more UEs that transmitted one or more respective preambles on the second set of ROs.

11. The method of claim 10, wherein the first and second sets of time-domain resources are indicated based on an offset related to a time-domain resource allocation of a respective set of ROs used to transmit the associated preamble.

12. The method of claim 11, wherein the offset is based on an RO-index and an initial RO-index associated with the respective set of ROs used to transmit the associated preamble.

13. The method of claim 10, wherein the first and second set of ROs overlap in terms of frequency.

14. The method of claim 9, wherein the DCI communication comprises a set of interference parameters of a physical downlink shared channel (PDSCH).

15. The method of claim 14, wherein the set of interference parameters comprises: a PDSCH signal power ratio between the UE and an interference signal, a modulation order of the interference signal,
a demodulation reference signal (DMRS) configuration of the UE, or any combination thereof.

16. A method of operating a user equipment (UE), comprising:

identifying a first set of random access channel (RACH) opportunities (ROs) over which to transmit a preamble associated with a RACH procedure;

selecting a first preamble sequence group from among a plurality of preamble sequence groups associated with the identified first set of ROs based on a downlink receive capability of the UE, wherein the first preamble sequence group is associated with a first UE downlink receive capability level and a second preamble sequence group among the plurality of preamble sequence groups is associated with a second UE downlink receive capability level that is higher than the first UE downlink receive capability level;

transmitting the preamble on the identified set of ROs; and monitoring a group common (GC)-downlink control information (DCI) communication that is scrambled using a common random access radio network temporary identifier (RA-RNTI).

17. The method of claim 16, wherein the GC-DCI communication is further monitored by at least one other UE associated with the same downlink receive capability as the UE which selected a second set of ROs based over which to transmit at least one respective preamble.

18. A method of operating a user equipment (UE), comprising:

receiving, from a first user equipment (UE), a first preamble associated with a first random access channel (RACH) procedure over a first set of ROs among a plurality of sets of RACH opportunities (ROs), wherein the first set of ROs over which the first preamble is received is associated with a first preamble sequence group among a plurality of preamble sequence groups, wherein the first preamble sequence group is associated with a first UE downlink receive capability level and a second preamble sequence group among the first plurality of preamble sequence groups is associated with a second UE downlink receive capability level that is higher than the first UE downlink receive capability level;

receiving, from a second UE, a second preamble associated with a second RACH procedure over a second set of ROs among the plurality of sets of ROs, wherein the second set of ROs over which the second preamble is received is associated with a third preamble sequence group among a second plurality of preamble sequence groups, wherein the third preamble sequence group is associated with the first UE downlink receive capability level and a fourth preamble sequence group among the second plurality of preamble sequence groups is associated with the second UE downlink receive capability level; and transmitting, to the first and second UEs in response to the first and second preambles, a group common (GC)-downlink control information (DCI) communication that is scrambled using a common random access radio network temporary identifier (RA-RNTI), wherein the GC-DCI communication includes information targeted to both the first and second UEs.

19. The method of claim 18, wherein the GC-DCI indicates (i) a first set of time-domain resources for random access response (RAR) to the first UE, and (ii) a second set of time-domain resources for RAR to the second UE.

20. A method of operating a user equipment (UE), comprising:

receiving, from a first user equipment (UE), a first preamble associated with a first random access channel (RACH) procedure over a first set of ROs among a plurality of sets of RACH opportunities (ROs); and receiving, before a response to the preamble is transmitted, an uplink message associated with the RACH procedure on a set of physical uplink shared channel (PUSCH) opportunities (POs), wherein the uplink message includes information indicative of a first downlink receive capability level associated with the UE.

21. The method of claim 20, further comprising:

transmitting, in response to the preamble, a downlink control information (DCI) communication that is scrambled using a first access radio network temporary identifier (RA-RNTI) that is based on the information.

22. The method of claim 21, wherein the first RA-RNTI is different than a second RA-RNTI associated with a second downlink receive capability level.

23. The method of claim 21, wherein the DCI communication is a group common (GC)-DCI communication, and wherein the GC-DCI communication is further monitored by at least one other UE which selected a second set of ROs based over which to transmit at least one respective preamble, the first and second UEs both being associated with the first downlink receive capability level.

\* \* \* \* \*